(12) United States Patent
Shiono et al.

(10) Patent No.: US 8,264,940 B2
(45) Date of Patent: Sep. 11, 2012

(54) RECORDING/REPRODUCTION DEVICE, RECORDING/REPRODUCTION METHOD, AND INFORMATION RECORDING MEDIUM

(75) Inventors: Teruhiro Shiono, Osaka (JP); Yoshiharu Kobayashi, Osaka (JP); Takashi Mihara, Hyogo (JP)

(73) Assignee: Panasonic Corporation, Osaka (JP)

( * ) Notice: Subject to any disclaimer, the term of this patent is extended or adjusted under 35 U.S.C. 154(b) by 102 days.

(21) Appl. No.: 12/746,402

(22) PCT Filed: Dec. 5, 2008

(86) PCT No.: PCT/JP2008/003615
§ 371 (c)(1), (2), (4) Date: Jun. 4, 2010

(87) PCT Pub. No.: WO2009/072297
PCT Pub. Date: Jun. 11, 2009

(65) Prior Publication Data
US 2010/0260032 A1     Oct. 14, 2010

(30) Foreign Application Priority Data
Dec. 6, 2007 (JP) .................................. 2007-315602

(51) Int. Cl.
*G11B 7/00* (2006.01)
(52) U.S. Cl. ..................... 369/116; 369/47.5; 369/275.4
(58) Field of Classification Search .................. 369/116, 369/47.5, 47.51, 120, 121, 122, 275.3, 275.4
See application file for complete search history.

(56) References Cited

U.S. PATENT DOCUMENTS

| | | | |
|---|---|---|---|
| 7,209,419 B2 * | 4/2007 | Suzuki | 369/47.53 |
| 7,324,417 B2 * | 1/2008 | Morishima | 369/53.18 |
| 7,656,777 B2 * | 2/2010 | Yamamoto et al. | 369/275.1 |
| 7,719,938 B2 * | 5/2010 | Kurose | 369/47.53 |
| 7,969,834 B2 * | 6/2011 | Hamaguchi et al. | 369/44.37 |
| 2005/0207328 A1 | 9/2005 | Yamamoto et al. | |

(Continued)

FOREIGN PATENT DOCUMENTS

JP         4-86283   * 3/1992

(Continued)

OTHER PUBLICATIONS

International Search Report for corresponding International Application No. PCT/JP2008/003615 mailed Mar. 3, 2009.

*Primary Examiner* — Nabil Hindi
(74) *Attorney, Agent, or Firm* — Renner, Otto, Boisselle & Sklar, LLP

(57) ABSTRACT

The present invention contributes to getting a reproduction/recording operation done with stability on an information recording medium by utilizing an absorption edge shifting phenomenon. An apparatus 100 according to the present invention includes: a light source 20 for emitting a laser beam; a lens 6 for condensing the beam onto an information recording medium 21; and a photodetector 19 for detecting light reflected from the medium 21, of which a recording layer includes a material that absorbs the beam at an increasing absorptance as the absorption edge of a light absorption spectrum shifts, with a rise in temperature, toward a longer wavelength range as a result of a band-to-band transition of electrons. The apparatus 100 of this invention further includes: a wavelength detecting section 26 for detecting at least one of the wavelength of the beam and its variation; a temperature sensing section 27 for sensing at least one of the temperature of the medium 21 or its ambience and its variation; and a control section 28 for controlling the power of the light source 20 based on the respective outputs of the wavelength detecting section 26 and the temperature sensing section 27.

21 Claims, 9 Drawing Sheets

U.S. PATENT DOCUMENTS

2005/0286374 A1* 12/2005 Kakao et al. ............... 369/53.1
2006/0013090 A1   1/2006 Yokoi
2006/0072436 A1*  4/2006 Mizushima et al. ....... 369/275.1

FOREIGN PATENT DOCUMENTS

| JP | 06-004868 | 1/1994 |
| JP | 08-167150 | 6/1996 |
| JP | 08-315400 | 11/1996 |
| JP | 2001-297437 | 10/2001 |
| JP | 2001-297465 | 10/2001 |
| JP | 2004-192679 | 7/2004 |
| JP | 2006-012254 | 1/2006 |
| WO | 03/102941 A1 | 12/2003 |

* cited by examiner (a)

(b)

(a)

(b)

US 8,264,940 B2

RECORDING/REPRODUCTION DEVICE, RECORDING/REPRODUCTION METHOD, AND INFORMATION RECORDING MEDIUM

TECHNICAL FIELD

The present invention relates to an apparatus and method for reproduction and/or recording information optically and also relates to an information recording medium.

BACKGROUND ART

Optical memory systems, which use an optical disc such as a compact disc (CD), a DVD or a BD (Blu-ray Disc) or an optical card as an information recording medium, have been used extensively as optical information reproduction/recording apparatuses.

To realize a storage capacity that is big enough to store a huge amount of information, a lot of people think it a good idea to use a multilayer information recording medium that has multiple recording layers. However, as the number of recording layers stacked in a single recording medium increases, the light needs to pass through the many recording layers to get a recording operation done on the deeper target recording layer. Thereby, the intensity of the light drops to a lower value when it reaches the target. As a result, the recording operation could not be performed as intended or the number of recording layers stacked could not be increased anymore. In this case, the "shallowest" recording layer is supposed to be located closest to the objective lens and the "deepest" recording layer is supposed to be located most distant from the objective lens.

To overcome such a problem, a multilayer optical recording medium, of which each recording layer is made up of a variable absorption film and a transparent recording film arranged adjacent to the variable absorption film, and an apparatus for reproduction and/or recording from/to it have been proposed (see Patent Document No. 1). In the variable absorption film, an absorption edge shifting phenomenon that the absorption edge of the absorption spectrum will shift to a longer wavelength range as the temperature rises is observed.

Among the multiple recording layers, the incident light for recording is condensed on the target recording layer. That is why the temperature of the variable absorption film rises, and its absorptance with respect to the incident light for recording increases, thus generating heat, which is then transferred to the transparent recording film. As a result, a recording operation can get done on it with good sensitivity. With respect to every recording layer but the target layer, however, the light for recording is defocused, and therefore, the temperature of its variable absorption film hardly rises, and the decrease in the transmittance of the recording layer can be minimized. As a result, according to Patent Document No. 1, recording energy that is high enough to get a recording operation done successfully is secured for even the deepest recording layer, and a recording operation could get done as intended even on a multilayer information recording medium with five to ten layers.

Patent Document No. 1: Pamphlet of PCT International Application Publication No. 03/102941

DISCLOSURE OF INVENTION

Problems to be Solved by the Invention

However, the present inventors discovered as a result of extensive researches that in the reproduction/recording apparatus disclosed in Patent Document No. 1, if the temperature of the light source section changed to vary the wavelength of the light for recording when the apparatus is performing a recording operation on an information recording medium by taking advantage of the absorption edge shifting phenomenon, the recording sensitivity of the information recording medium including the variable absorption film also varied. We also discovered that even if the temperature of the information recording medium itself changed, that of the variable absorption film also changed, thus causing a variation in recording sensitivity, too.

It is therefore an object of the present invention to get a reproduction/recording operation done with stability on an information recording medium by taking advantage of the absorption edge shifting phenomenon.

Means for Solving the Problems

An apparatus according to the present invention includes: a light source for emitting a laser beam; a lens for condensing the laser beam onto an information recording medium; and a photodetector for detecting light that has been reflected from the information recording medium. A recording layer of the information recording medium includes a material that absorbs the laser beam at an increasing absorptance as the absorption edge of a light absorption spectrum shifts, with a rise in temperature, toward a longer wavelength range as a result of a band-to-band transition of electrons. The apparatus is characterized by further including: a wavelength detecting section for detecting the wavelength of the laser beam with or without a variation in the wavelength; a temperature sensing section for sensing the temperature of the information recording medium itself or its ambience with or without a variation in the temperature; and a control section for controlling the power of the light source based on the respective outputs of the wavelength detecting section and the temperature sensing section.

In one preferred embodiment, in performing a recording operation, if the variation in the wavelength of the laser beam from its value in a reference state is identified by $\Delta\lambda$, the variation in the temperature of the information recording medium itself or its ambience from its value in the reference state is identified by $\Delta T$, their factors of proportionality are identified by k1 and k2, respectively, and the power of the light source in the reference state is identified by P0, the control section controls the power P of the light source so that the power P satisfies $0.990\,(k1\Delta\lambda/(k2\Delta T)) \leq P \leq 1.1 P0\,(k1\Delta\lambda)/(k2\Delta T)$.

In another preferred embodiment, in performing a reproduction operation, if the variation in the wavelength of the laser beam from its value in a reference state is identified by $\Delta\lambda$, the variation in the temperature of the information recording medium itself or its ambience from its value in the reference state is identified by $\Delta T$, their factors of proportionality are identified by k1 and k2, respectively, and the power of the light source in the reference state is identified by P0, the control section controls the power P of the light source so that the power P satisfies $0.9 P0\,(k1\Delta\lambda)/(k2\Delta T) \leq P \leq 1.1 P0\,(k1\Delta\lambda)/(k2\Delta T)$ in a situation where the information recording medium has an L to H property. But the control section controls the power P of the light source so that the power P satisfies $0.9 P0\,(k2\Delta T)/(k1\Delta\lambda) \leq P \leq 1.1 P0\,(k2\Delta T)/(k1\Delta\lambda)$ in a situation where the information recording medium has an H to L property.

In a specific preferred embodiment, the factors of proportionality k1 and k2 satisfy k1=1.08 and k2=0.054, respectively.

In still another preferred embodiment, the wavelength detecting section includes a wavelength-detecting, diffractive optical element for diffracting the laser beam, and a wavelength-detecting photodetector that has at least two split areas.

In this particular preferred embodiment, the apparatus further includes a focus/tracking error signal generating optical element, and the diffractive optical element and the focus/tracking error signal generating optical element are arranged on the same substrate.

In an alternative preferred embodiment, the apparatus further includes a focus/tracking error signal generating optical element and a focus/tracking error signal generating photodetector, and the focus/tracking error signal generating photodetector and the wavelength-detecting photodetector are arranged on the same substrate.

In yet another preferred embodiment, the wavelength detecting section includes a wavelength selecting filter and a wavelength-detecting photodetector.

In yet another preferred embodiment, the wavelength detecting section includes a temperature sensor for sensing the temperature of the light source itself or its ambience with or without a variation in the temperature.

In yet another preferred embodiment, the temperature sensing section includes an infrared sensor.

In yet another preferred embodiment, the apparatus further includes a storage section that stores methods for controlling the power of the light source based on the output of the wavelength detecting section and based on the output of the temperature sensing section, respectively, and the control section controls the power of the light source by any of the methods for controlling the power of the light source.

In yet another preferred embodiment, the information recording medium stores sensitivity information about a variation in reproduction or recording sensitivity that has been caused by the variation in the wavelength of the laser beam and the variation in the temperature of the information recording medium itself or its ambience, and the control section controls the power of the light source by reference to the sensitivity information.

An information recording medium according to the present invention may be used by the apparatus of the present invention described above. The information recording medium stores sensitivity information about a variation in reproduction or recording sensitivity that has been caused by the variation in the wavelength of the laser beam and the variation in the temperature of the information recording medium itself or its ambience.

In one preferred embodiment, the sensitivity information just indicates whether or not the reproduction or recording sensitivity varies at all in response to the wavelength variation and the temperature variation.

In an alternative preferred embodiment, the sensitivity information includes information about a relation between the wavelength and temperature variations and a variation in the reproduction sensitivity or information about a relation between the wavelength and temperature variations and a variation in the recording sensitivity.

In another preferred embodiment, the information recording medium includes multiple recording layers and multiple space layers, which are alternately stacked one upon the other, and the sensitivity information is stored in one of the recording layers that is located most distant from the lens.

Another information recording medium according to the present invention may be used in the apparatus of the present invention described above. The information recording medium includes multiple recording layers and multiple space layers, which are alternately stacked one upon the other. The wavelength $\lambda$ of the laser beam satisfies 0.39 $\mu m \leq \lambda \leq 0.42$ $\mu m$. Each recording layer includes a recording film, which is made of either $Bi_2O_x$ that satisfies $2.75 \leq x < 3$ or $3 < x \leq 3.3$ or a material mainly composed of such $Bi_2O_x$.

In one preferred embodiment, each recording layer further includes a first dielectric film, which has a higher melting point than the recording film and which includes no S and a second dielectric film including ZnS, and the first dielectric film is arranged between the recording film and the second dielectric film.

In this particular preferred embodiment, the first dielectric film is mainly composed of at least one of $ZrSiO_4$, $ZrO_2$, $Y_2O_3$, $HfO_2$, $Al_2O_3$, AlN, $CeO_2$, $Dy_2O_3$ and MgO.

In a specific preferred embodiment, the second dielectric film is mainly composed of $ZnS$—$SiO_2$.

In another preferred embodiment, the recording film includes, as an additive, at least one of Ge, Nb, Ta, Cu, Mo, W, Cr, Al, Si, Ir, Ni, Co, Ru and Rh.

In this particular preferred embodiment, the additive is included at an atomic number ratio of 1/44 to 1/9 with respect to Bi.

A method according to the present invention is a method for getting a reproduction or recording operation performed by the apparatus of the present invention described above on the information recording medium. Information is reproduced or recorded by irradiating the information recording medium with the laser beam, which has been emitted from the light source after having had its power controlled based on the respective outputs of the wavelength detecting section and the temperature sensing section.

In one preferred embodiment, the control section determines the power of the light source in the reference state based on a result of a test recording operation that has been performed on the information recording medium. If the output of either the wavelength detecting section or the temperature sensing section exceeds a predetermined value with respect to the output in the reference state, a test recording operation is performed on the information recording medium again, thereby the control section changes the powers of the light source.

In one preferred embodiment of the recording method, the power of the light source in the reference state is determined based on a result of a test recording operation that has been performed on the information recording medium. If the output of either the wavelength detecting section or the temperature sensing section exceeds a predetermined value with respect to the output in the reference state, a test recording operation is performed on the information recording medium again, thereby changing the powers of the light source.

Effects of the Invention

According to the present invention, reproduction and recording operations can get done with stability on an information recording medium by taking advantage of the absorption edge shifting phenomenon.

In addition, according to the present invention, even if the wavelength of the light for reproduction or recording has changed due to a variation in the temperature of the light source section in the optical information reproduction/recording apparatus, that wavelength variation is detected by its wavelength detecting section. Also, even if the temperature of the information recording medium itself has changed, that temperature variation is sensed by its medium temperature sensing section. By controlling the power of the light source based on those variations detected and sensed so that the reproduction or recording sensitivity remains substantially constant, an optical information reproduction/recording apparatus, a reproduction/recording method and information recording medium, which contribute to getting the reproduction/recording operation done with stability, are provided.

Figure 1:
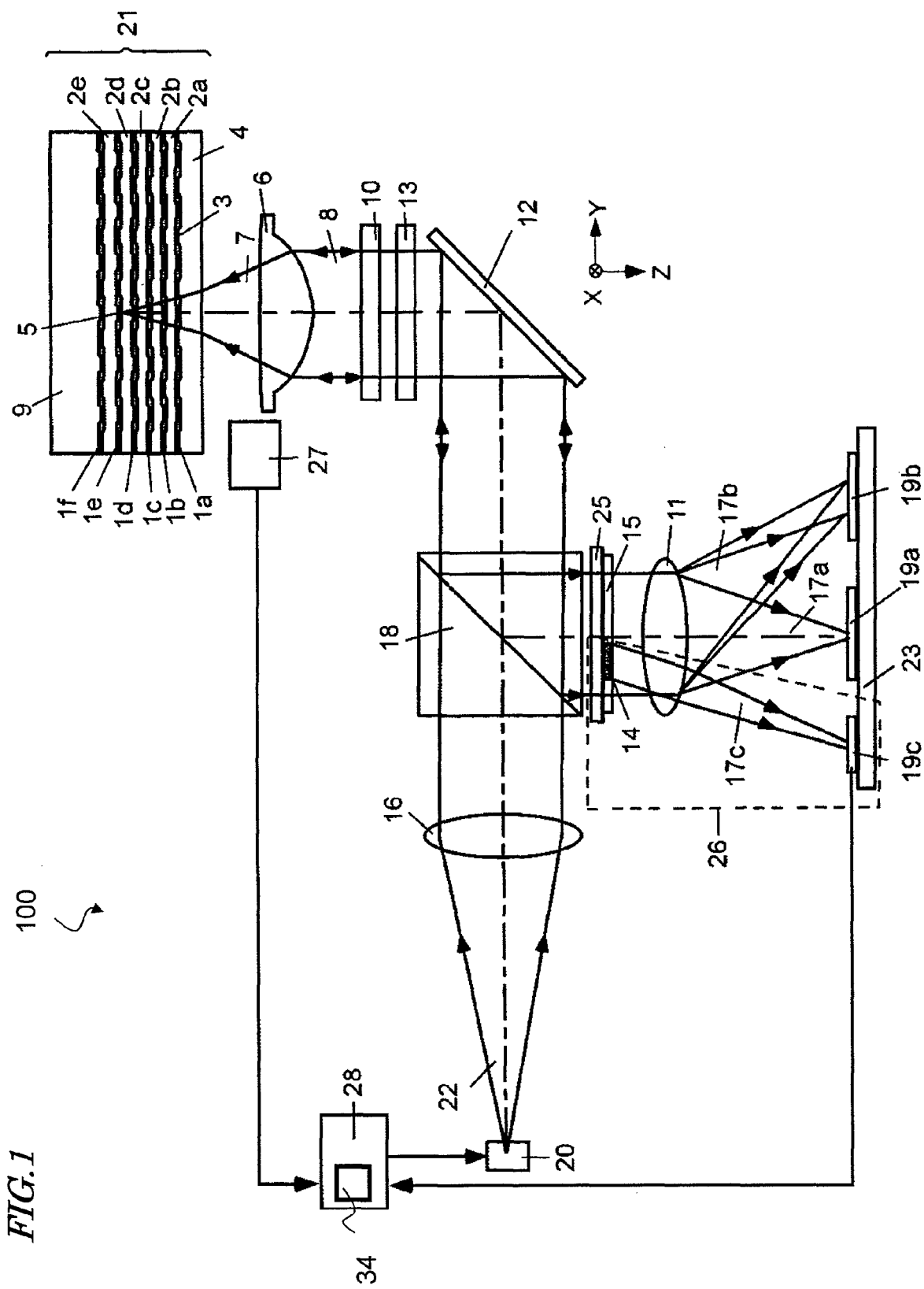
FIG. 1 illustrates a configuration for an optical information reproduction/recording apparatus as a first specific preferred embodiment of the present invention and also illustrates how to reproduce or record a signal from/on an information recording medium.

DESCRIPTION OF REFERENCE NUMERALS 1 recording layer
2 space layer
3 track groove
4 protective coating
5 recording mark
6 objective lens
7 converged light
8 substantially parallel light
9 substrate for information recording medium
10 spherical aberration correcting element
11 detection lens
12 reflecting mirror
13 wavelength plate
14 wavelength detecting diffractive optical element
15 focus/tracking error signal generating optical element
16 collimator lens
17a converged light (for reproduction signal and focus error signal)
17b converged light (for tracking error signal)
17c converged light (for detecting wavelength)
18 beam splitter (branching element)
19a photodetector (for reproduction signal and focus error signal)
19b photodetector (for tracking error signal)
19c photodetector (for detecting wavelength)
20 light source
21 information recording medium
22 emitted light
23 photodetector substrate
24 light receiving section
25 optical element substrate
26 wavelength detecting section
27 medium temperature sensing section
28 light source power control section
29 wavelength selecting filter
30 reflective layer
31 second dielectric material
32 first dielectric material
33 recording film
34 storage section

BEST MODE FOR CARRYING OUT THE INVENTION

Hereinafter, preferred embodiments of the present invention will be described with reference to the accompanying drawings.

(Embodiment 1)

First of all, an Optical Information reproduction/recording apparatus, reproduction/recording method and information recording medium as a first preferred embodiment of the present invention will be described in detail with reference to FIGS. 1 through 11.

FIG. 1 illustrates a configuration for an optical information reproduction/recording apparatus 100 as a first specific preferred embodiment of the present invention and also illustrates how to reproduce or record a signal from/on an information recording medium 21. FIG. 2(a) illustrates the arrangement of a wavelength detecting section 26 for the optical information reproduction/recording apparatus 100 of the first preferred embodiment of the present invention. And FIG. 2(b) illustrates the structure of a photodetector 19c that the wavelength detecting section 26 of the first preferred embodiment of the present invention has and also illustrates how the spot of the condensed light beam moves as the wavelength varies.

FIG. 3(a) illustrates a wavelength detecting section for the optical information reproduction/recording apparatus of the first preferred embodiment of the present invention. FIG. 3(b)

illustrates a photodetector that the wavelength detecting section has and also illustrates a spot formed by the converged light that has been incident on the photodetector. FIG. 4(a) illustrates an information recording medium as the first preferred embodiment of the present invention. FIG. 4(b) illustrates the structure of one of multiple recording layers that the information recording medium 21 has. And FIG. 4(c) illustrates a recording layer with a dual layer structure.

FIGS. 5 through 8 show how the transmittance changes with the temperature in the information recording medium as the first preferred embodiment of the present invention.

Figure 9:
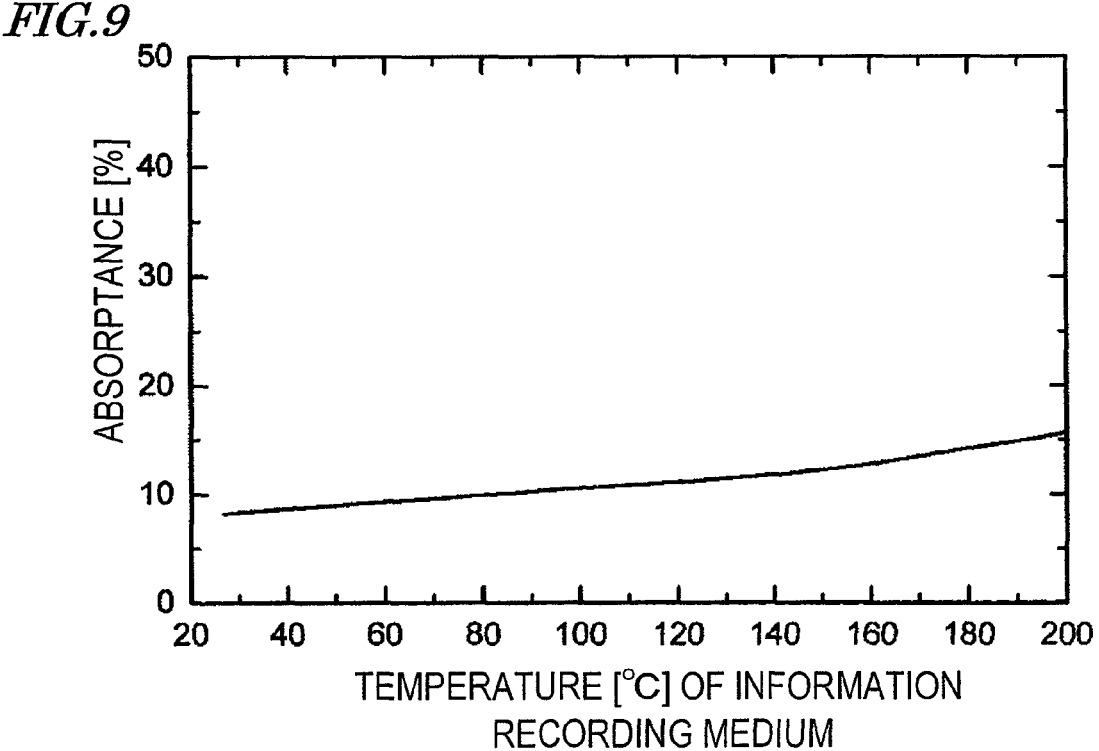
FIG. 9 shows how the absorptance with respect to incident light for recording varies according to the temperature of a (single-layer) information recording medium as the first preferred embodiment of the present invention.
Figure 10:
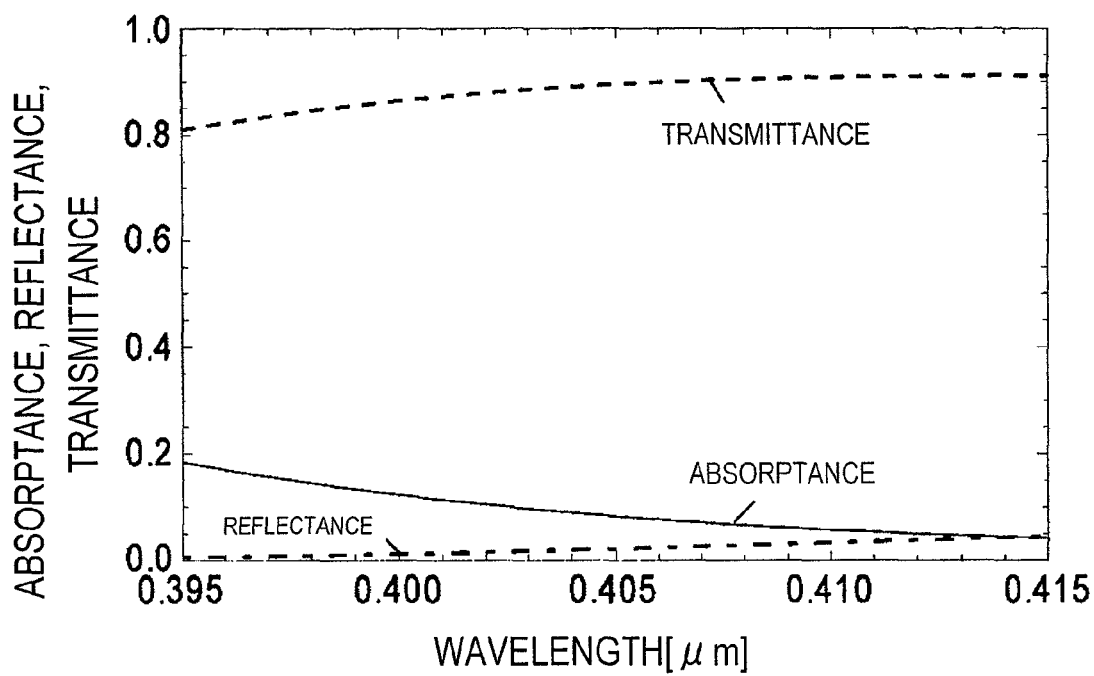
FIG. 10 shows how the absorptance, reflectance and transmittance of the (single-layer) information recording medium of the first preferred embodiment of the present invention may vary according to the wavelength of the incident light for reproduction or recording.
Figure 11:
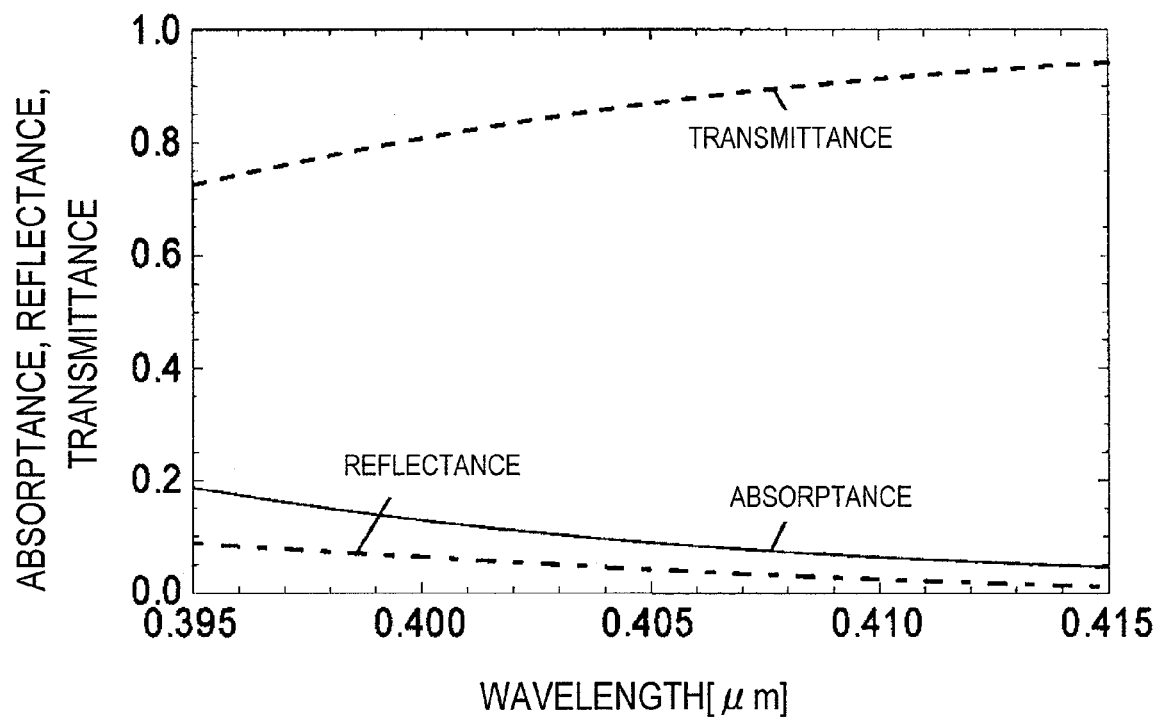
FIG. 11 shows how the absorptance, reflectance and transmittance of an information recording medium with a different structure from the counterpart of the first preferred embodiment of the present invention may vary according to the wavelength of the incident light for reproduction or recording.

FIG. 9 shows how the absorptance with respect to incident light for recording varies according to the temperature of a (single-layer) information recording medium as the first preferred embodiment of the present invention. FIG. 10 shows how the absorptance, reflectance and transmittance of the (single-layer) information recording medium of the first preferred embodiment of the present invention may vary according to the wavelength of the incident light for reproduction or recording. As used herein, the "single-layer" means that the information recording medium has only one recording layer. FIG. 11 shows how the absorptance, reflectance and transmittance of the (single-layer) information recording medium may vary according to the wavelength of the incident light for reproduction or recording.

The optical information reproduction/recording apparatus 100 includes a light source 20 that emits light for reproduction or recording, an objective lens 6 that condenses the light emitted from the light source 20 toward the information recording medium 21, photodetectors 19a, 19b and 19c for detecting the light that has been reflected from the information recording medium 21, a wavelength detecting section 26 for detecting the wavelength of the light for reproduction or recording with or without a variation in the wavelength, a medium temperature sensing section 27 for sensing the temperature of the information recording medium 21 itself or its ambience with or without a variation in the temperature, and a light source power control section 28 for controlling the power of the light source 20 based on the respective outputs of the wavelength detecting section 26 and the medium temperature sensing section 27. The reproduction/recording method of the present invention is a method for performing a reproduction or recording operation with the power of the light source 20 controlled based on the respective outputs of the wavelength detecting section 26 and the medium temperature sensing section 27. It should be noted that the "ambience" of the information recording medium 21 refers herein to the space in the optical information reproduction/recording apparatus 100 with which the information recording medium 21 is loaded and means a range of which the temperature variation could be regarded as being substantially the same as that of the information recording medium 21 itself. For example, the ambience may be the space between the information recording medium 21 loaded and its adjacent member and may also include such an adjacent member itself.

As shown in FIG. 1, in this optical information reproduction/recording apparatus 100, a semiconductor laser diode for emitting a laser beam is provided as the light source 20 for use to perform both reproduction and recording operations, and a collimator lens 16, a beam splitter 18, a reflecting mirror 12, a wavelength plate 13, a spherical aberration correcting element 10, and an objective lens 6 are arranged in this order along the optical path that leads from the light source 20 to the information recording medium 21. A polarization beam splitter is preferably used as the beam splitter 18 and a quarter wavelength plate is preferably used as the wavelength plate 13 because the light can be used efficiently in both directions along the optical paths leading to, and returning from, the information recording medium. For that reason, the optical members 18 and 13 are supposed to be a polarization beam splitter and a quarter wavelength plate, respectively, in the following description.

Meanwhile, along the returning optical path leading from the beam splitter 18 to the photodetectors 19, a focus/tracking error signal detecting optical element 15 and a wavelength detecting diffractive optical element 14 which are integrated together on the same optical element substrate 25 and a detection lens 11 are arranged.

By combining the wavelength detecting diffractive optical element 14 with the photodetector 19c, the wavelength detecting section 26 for detecting the wavelength of the light for reproduction or recording with or without a variation in the wavelength is formed. On the other hand, the medium temperature sensing section 27 senses the temperature of the information recording medium 21 itself or its ambience with or without a variation in the temperature. It is preferred that a so-called "radiation thermometer" be formed by using an infrared sensor such as a pyroelectric element or a thermopile as the medium temperature sensing section 27 because the temperature of the information recording medium 21 can be sensed by a non-contact method. Also, even if the temperature of the information recording medium 21 itself is measured but if its ambience can be regarded as having substantially the same temperature, the ambient temperature could be measured with a temperature sensor using a thermistor, for example.

The light source power control section 28 controls the power of the light source 20 based on the respective outputs of the wavelength detecting section 26 and the medium temperature sensing section 27. In this case, if the power of the light source 20 is controlled so that the reproduction or recording sensitivity remains substantially constant, an optical information reproduction/recording apparatus that can always perform a reproduction/recording operation with good stability is realized.

It should be noted that since the reflectance counts when it comes to reproduction, either the reflectance detected or the intensity of the reflected light will be referred to herein as "reproduction sensitivity" as opposed to the recording sensitivity. If the "reproduction sensitivity remains substantially constant", it means that the intensity of the reflected light to be used as light for reproduction is substantially constant. Thus, in that case, the information recording medium 21 needs to maintain the same reflectance with respect to the light for reproduction.

The wavelength λ of the light for reproduction or recording satisfies $0.39\ \mu m \leq \lambda \leq 0.42\ \mu m$, which is preferably met to use a semiconductor laser diode as the light source. A blue-violet semiconductor laser diode is used as the light source 20, and the light for recording may have a wavelength λ of 0.405 μm at room temperature of 25° C. The blue-violet semiconductor laser diode is made of GaN-based materials. As the temperature of the laser diode rises, the absorption edge will shift and the bandgap will change in the GaN-based materials, thus making the oscillation wavelength longer as in the information recording medium of the present invention. That temperature dependence is approximately 0.05 nm/° C. That is to say, the oscillation wavelength increases by approximately 0.05 nm every time the temperature rises by 1° C. That is why if the temperature varies (i.e., rises) by 20° C., the wavelength will vary (increase) by about 1 nm, for example. This value is much smaller than the wavelength variation rate of a red semiconductor laser. That is why to reduce the wavelength variation, it is effective to use such a blue-violet semiconductor laser diode.

As this optical information reproduction/recording apparatus is used continuously by performing reproduction/recording operations a number of times, more and more heat is generated by the light source 20 and its surrounding sections, circuits in the control section, and the motor and its associated mechanism to raise the temperature inside the apparatus gradually. As a result, the temperature eventually gets saturated so as to strike an adequate balance with the temperature outside of the optical information reproduction/recording apparatus. The light source 20 and its surrounding sections are designed so that the chip of the semiconductor laser diode is mounted on a heat sink such as a copper or Si plate and is encapsulated in a metallic package. The heat generated by the semiconductor laser chip portion is dissipated into the heat sink and then into the metallic package, and its temperature eventually gets saturated and substantially balanced. That is why the DC type temperature variation in the semiconductor laser chip portion during a reproduction/recording operation would substantially agree with the variation in the temperature of the light source 20 and its surrounding sections (i.e., the metallic package).

Also, the oscillation wavelength of the blue-violet semiconductor laser diode has an optical power dependence of 0.016 nm/mW. Thus, if the optical power is varied by 100 mW, for example, then the wavelength will change by 1.6 nm. For that reason, comparing the wavelength of the light for reproduction and that of the light for recording to each other, the light for recording tends to have a wavelength that is longer than the light for reproduction by approximately 1-5 nm according to the optical power, even if the light for reproduction and the light for recording have been produced by the same light source.

A recording operation is performed by getting light emitted by the light source 20 at a relatively high peak power of 50 mW to 300 mW (which decreases to the range of 7 mW to 50 mW when the light is transmitted through the objective lens 6) according to the recording sensitivity of the information recording medium 21. Meanwhile, in performing a reproduction operation, the light for reproduction is emitted with the power reduced to a level that is too low to cause any recording on the information recording medium 21 (e.g., to a fiftieth to a tenth of the recording power).

The information recording medium 21 includes an information recording medium substrate 9 with a diameter of 12 cm and a thickness of 1.1 mm and a number of recording layers (which are six layers 1a through 1f in the example illustrated in FIG. 1) and a number of space layers 2 (which are five layers 2a through 2e in the example illustrated in FIG. 1), which have been alternately stacked one upon the other on that information recording medium substrate 9. The information recording medium 21 further includes a protective coating 4 with a thickness of 0.1 mm, for example, on its light incident side. By providing the protective coating 4, even if there is any dust, dirt or scratch on the information recording medium, the recording medium is still playable. Each of those recording layers 1 has a structure with a number of track grooves 3 on which a tracking servo operation is performed. The track pitch Tp may be 0.32 μm and the groove depth may be 0.19 μm, for example. By getting the ±first order diffracted rays, which have been diffracted mainly by those grooves, detected by the photodetector 19b, a tracking error signal can be obtained and a reproduction/recording operation can get done accurately right along the tracks.

As shown in FIG. 1, when this optical information reproduction/recording apparatus 100 is performing a recording operation, the laser beam 22, which has been emitted by the light source 20 in the Y-axis direction as a linearly polarized light ray with a relatively high peak power as described above, is transformed by the collimator lens 16 into a substantially parallel light beam, transmitted through the beam splitter 18, and then has its optical path deflected in the −Z-axis direction by the reflecting mirror 12.

Thereafter, the substantially parallel light beam 8 that has been deflected in the −Z-axis direction is transformed by the wavelength plate 13 into a substantially circularly polarized light beam, which is then transmitted through the spherical aberration correcting element 10 and then condensed (as a converged light beam 7) by the objective lens 6 with a focal length of 2 mm and an effective diameter of 3.4 mm onto a target one 1e of the multiple recording layers 1 by way of the protective coating 4 of the information recording medium 21. As will be described later for its reproduction operation, focus servo and tracking servo operations are performed using the light reflected from the recording layer 1e and the optical constant of the recording film of that recording layer 1e is changed, thereby forming a recording mark 5.

In this case, the thickness of a portion of the information recording medium 21 that the converged light beam 7 needs to go through varies according to the depth at which the recording mark should be formed. That is why if the recording operation is performed with the magnitude of spherical aberration of the light beam controlled by the spherical aberration correcting element 10, which is arranged along the optical path leading from the light source 20 to the objective lens 6, according to the depth at which the recording mark 5 needs to be formed, the recording mark 5 can be formed just as intended. The spherical aberration correcting element 10 may be implemented as a liquid crystal element with a variable refractive index distribution, a beam expander with a combination of concave and convex lenses, of which the gap in the optical axis direction can be changed by an actuator, or a movable collimator lens, which can be moved in the optical axis direction by an actuator. It should be noted that if such a movable collimator is used, then it can perform both of the functions of the collimator lens 16 and the spherical aberration correcting element 10 by itself at a time. As a result, the arrangement of the optical members can be simplified.

Meanwhile, in performing a reproduction operation, the laser beam 22, which has been emitted from the light source 20 as a linearly polarized light ray with lower power, is also transformed by the collimator lens 16 into a substantially parallel light beam, transmitted through the beam splitter 18, and then has its optical path deflected by the reflecting mirror 12 toward the −Z-axis direction. Thereafter, the laser beam 8 that has been deflected toward the −Z-axis direction is transmitted through the wavelength plate 13 to be a circularly polarized light ray, which is transmitted through the spherical aberration correcting element 10 and then condensed (as a converged light beam 7) by the objective lens 6 toward a recording mark 5 on the target recording layer 1e of the information recording medium 21.

The laser beam that has been reflected from the recording mark 5 returns in the opposite direction and is transformed into a linearly polarized light beam by being transmitted through the objective lens 6, the spherical aberration correcting element 10 and the wavelength plate 13. The polarization direction of that returning linearly polarized light beam intersects at right angles with that of the light beam going toward the information recording medium. Next, the linearly polarized light beam passes through the reflecting mirror 12, has its optical axis deflected toward the Z-axis direction by the beam splitter 18, is incident on the focus/tracking error signal detecting optical element 15 and the wavelength detecting diffractive optical element 14, which are integrated together on the same optical element substrate 25, at the same time, and then is branched by those optical elements into a number of light rays (e.g., six light rays in the example illustrated in FIG. 1). And those light rays are grouped by the detection lens 11 into three converged light beams 17a, 17b and 17c. In this case, the light beam 17b may consist of four branched light rays, for example. It should be noted that the focus/tracking error signals means a focus error signal and a tracking error signal.

The converged light beam 17a to be an optical signal representing reproduced data is incident on a quadruple photodetector 19a, for example, which detects not only the recorded signal but also the focus error signal by astigmatism method, for example. On the other hand, the converged light beam 17b consisting of the four light rays is incident on another quadruple photodetector 19b, which detects the tracking error signal by the known APP (advanced push-pull) technique. And the other converged light beam 17c, which has been incident on, and diffracted and branched by, the wavelength detecting diffractive optical element 14, is incident on a wavelength detecting photodetector 19c with at least two split areas, which detects the wavelength of the light for reproduction or recording with or without a variation in the wavelength. Optionally, the apparatus 100 could be a reproduction-only apparatus.

Figure 2:
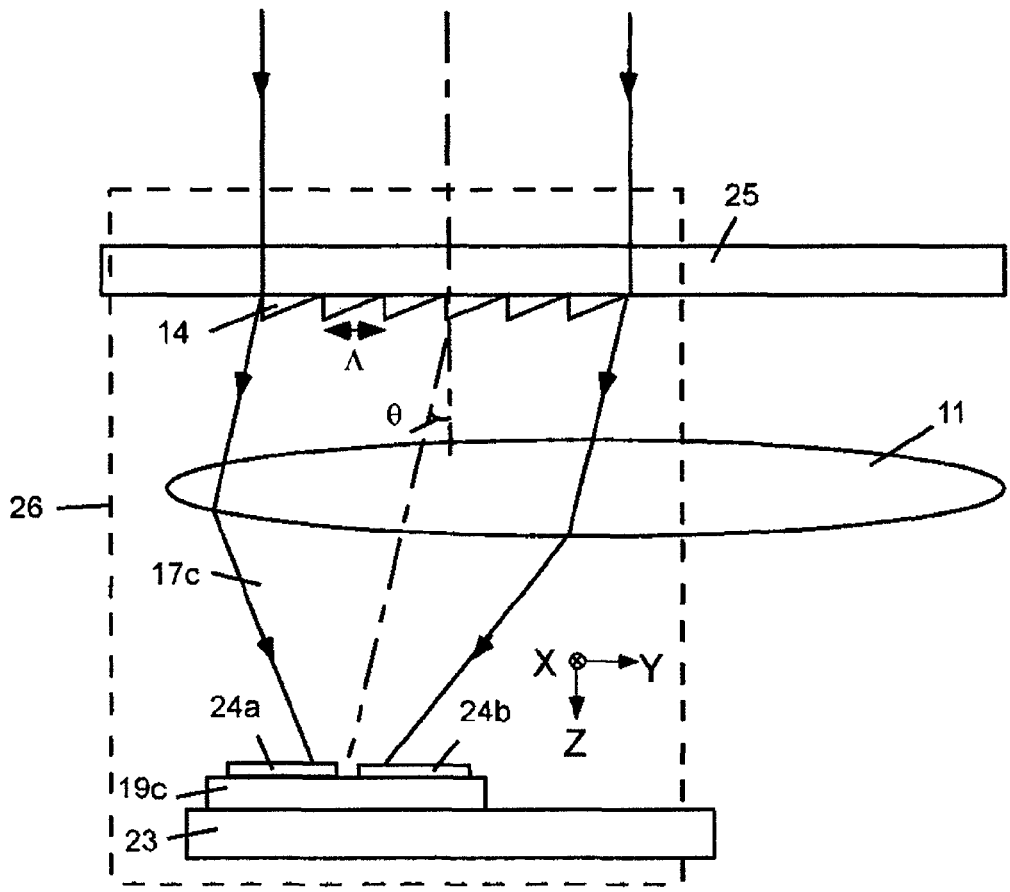
FIG. 2(a) illustrates the arrangement of a wavelength detecting section for the optical information reproduction/recording apparatus of the first preferred embodiment of the present invention.
FIG. 2(b) illustrates the structure of a photodetector that the wavelength detecting section has in the optical information reproduction/recording apparatus of the first preferred embodiment of the present invention and also illustrates how the spot of the condensed light beam moves as the wavelength varies.
Figure 2:
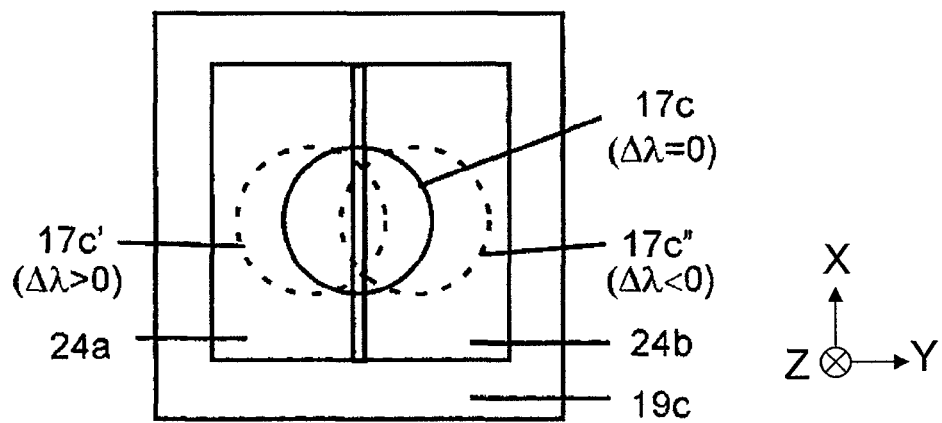

Hereinafter, the wavelength detecting section 26 for detecting the wavelength of the light for reproduction or recording will be described in detail with reference to FIG. 2. The wavelength detecting section 26 includes a wavelength detecting diffractive optical element 14 and a wavelength detecting photodetector 19c with at least two split areas (which will be referred to herein as "detection windows 24a and 24b", respectively). The wavelength detecting diffractive optical element 14 and the focus/tracking error signal detecting optical element 15 are integrated together on the same optical element substrate 25. Such an arrangement is preferably adopted to cut down the cost because the elements can be aligned with each other more easily and can be manufactured at a time by injection molding or 2P process, for example. Meanwhile, the wavelength detecting photodetector 19c, the reproduction/focus error signal generating photodetector 19a, and the tracking error signal generating photodetector 19b are all arranged on the same photodetector substrate 23. By adopting such an arrangement, those photodetectors 19 can be aligned with each other more easily and can be manufactured at the same time as an integrated structure, thus cutting down the manufacturing cost significantly.

The wavelength detecting diffractive optical element 14 may be designed in various manners. In this preferred embodiment, the diffractive optical element 14 is implemented as a linear grating with grooves running in the x direction and with a regular grating period Λ. To increase the diffraction efficiency, the diffractive optical element 14 has a blazed or multi-level cross section and is arranged so that a first-order diffracted ray is converged onto the center of the detection windows 24a and 24b of the photodetector 19c with the two split areas or the vicinity thereof.

The angle θ of diffraction of the first-order diffracted ray is determined so as to satisfy $\sin\theta = \lambda/\Lambda$ with respect to the wavelength λ of the light. Thus, if there is a wavelength variation Δλ, the angle θ of diffraction varies so as to satisfy this equation. For example, if Δλ>0, the angle of diffraction is so large that the spot 17c of the converged light beam moves to the position indicated by the dotted circle 17c'. Conversely, if Δλ<0, the angle of diffraction is so small that the spot 17c of the converged light beam moves to the position indicated by the dotted circle 17c''. Consequently, if (output of detection window 24a)—(output of detection window 24b) is calculated as the output of the photodetector 19c, the magnitude of the wavelength variation can be estimated by that output value. In this case, if the output value is zero, then there should be no wavelength variation.

For example, supposing the distance 1 between the wavelength detecting diffraction optical element 14 and the photodetector 19c as measured in the Z direction is 33 mm and wavelength detecting diffractive optical element 14 has a grating period Λ of 5 μm, the angles of diffraction θ become 4.646, 4.658 and 4.635 degrees when the wavelengths λ are 0.405 μm, 0.406 μm and 0.404 μm, respectively. Consequently, if the wavelength varies by 1 nm, the spot 17c of the condensed light beam moves 6.7 μm in the Y direction on the photodetector 19c. The wavelength variation can be detected with higher sensitivity by either increasing the distance 1 or decreasing the grating period Λ of the wavelength detecting diffractive optical element.

Furthermore, if the arrangement of the wavelength detecting diffractive optical element 14 and the photodetector 19c is determined so that the spot 17c of the condensed light beam is formed right at the center of the detection windows 24a and 24b as shown in FIG. 2(b) when the wavelength λ is 0.405 μm, not just the magnitude of the wavelength variation but also the wavelength itself can be estimated.

The wavelength detecting diffractive optical element 14 does not have to be such a linear grating with a regular grating period Λ as described above. Alternatively, with the curvature or period of the grating shape varied subtly, the diffractive optical element 14 may also be designed so that the aberration does not change so much even if the angle of diffraction θ varies or that the magnitude of shift of the condensed beam spot 17c and the magnitude of the wavelength variation change in proportion to each other.

Figure 3:
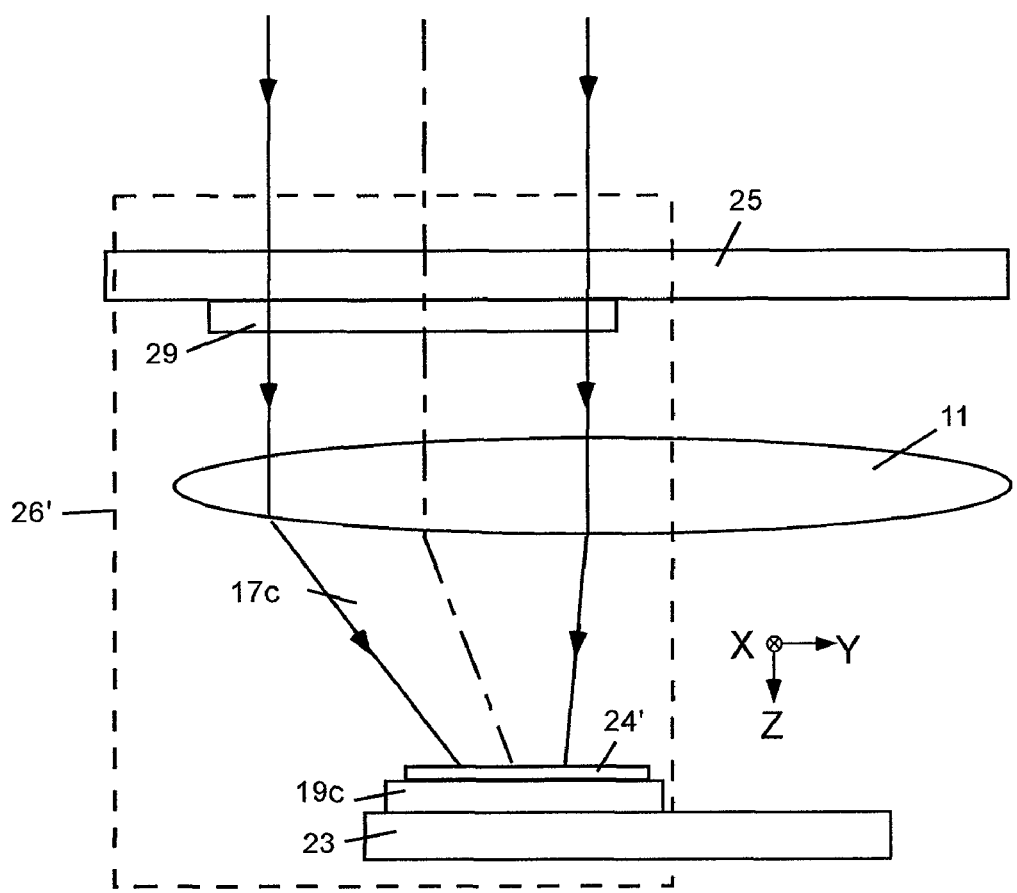
FIG. 3(a) illustrates a wavelength detecting section for the optical information reproduction/recording apparatus of the first preferred embodiment of the present invention.
FIG. 3(b) illustrates a photodetector that the wavelength detecting section has and also illustrates a spot formed by the converged light that has been incident on the photodetector.
Figure 3:
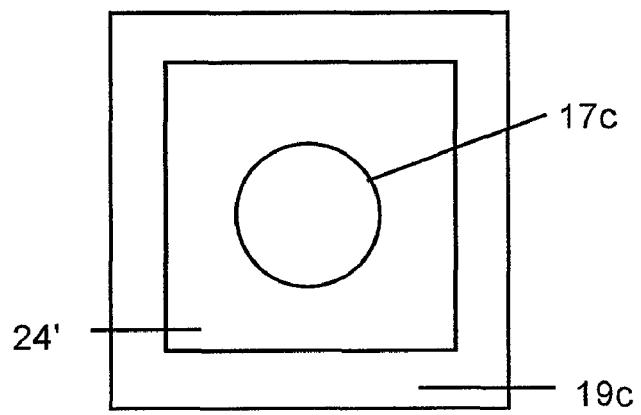
Figure 3:
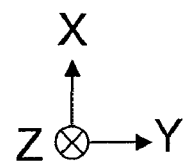
Figure 4:
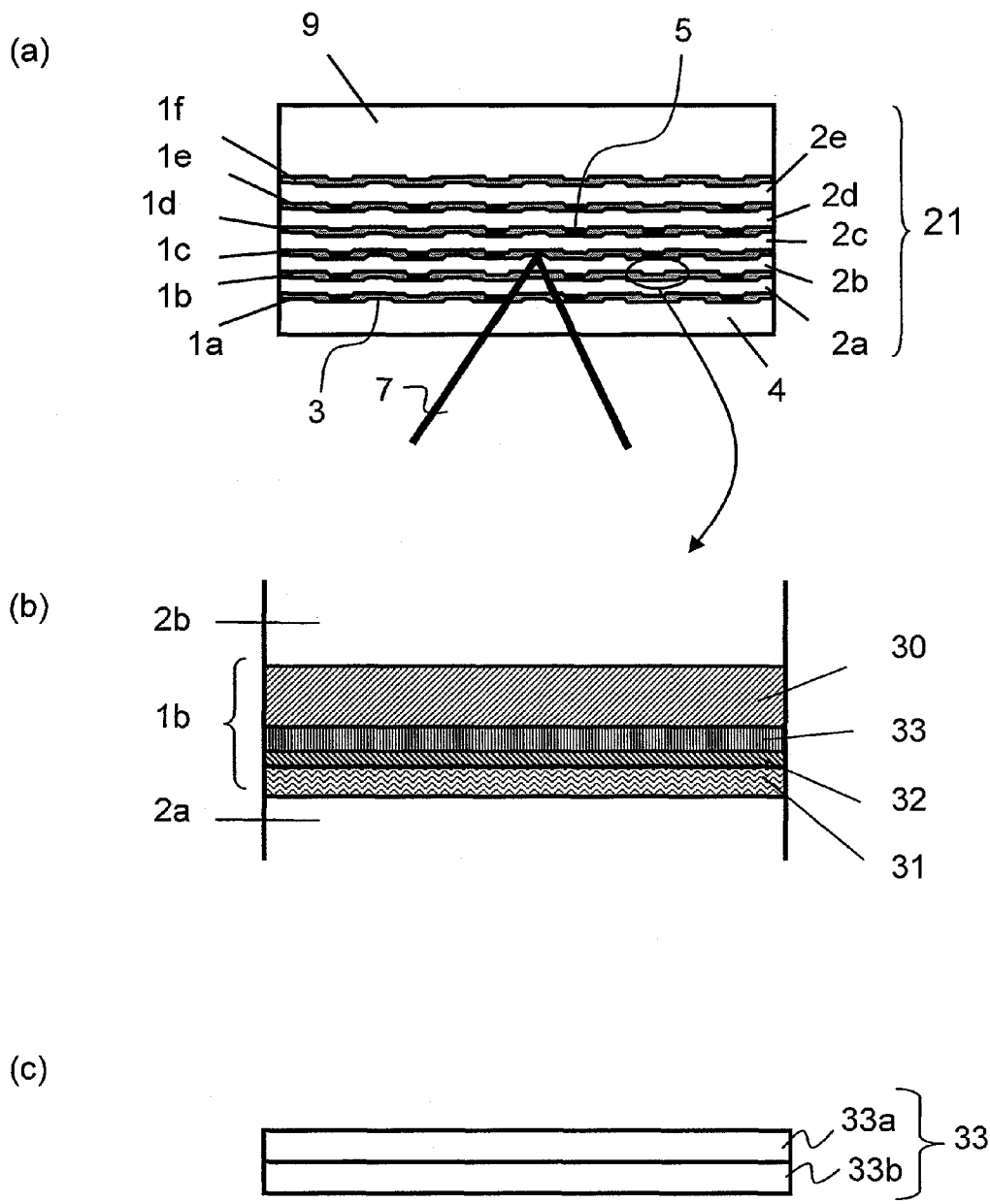
FIG. 4(a) illustrates an information recording medium as the first preferred embodiment of the present invention.
FIG. 4(b) illustrates the structure of one of multiple recording layers that the information recording medium 21 has.
FIG. 4(c) illustrates a recording layer with a dual layer structure.

Optionally, the wavelength detecting section 26 may also have a wavelength selecting filter, of which the transmittance varies according to the wavelength of the incoming light, on the optical path and use such a filter in combination with the photodetector. In that case, the wavelength of the light for reproduction or recording may be estimated based on the output value of the photodetector. A wavelength detecting section 26' with such a configuration will be described with reference to FIG. 3. FIG. 3(a) illustrates such an alternative wavelength detecting section 26' for the optical information reproduction/recording apparatus 100. On the other hand, FIG. 3(b) illustrates the photodetector 19c of the wavelength detecting section 26' and the spot 17c of the converged light beam that has been incident on the photodetector 19c.

The wavelength detecting section 26' includes a wavelength selecting filter 29, which is arranged on the optical path, and a photodetector 19c. The wavelength selecting filter 29 has its transmittance varied according to the wavelength of the incoming light. That is why the wavelength of the light for reproduction or recording can be estimated based on the magnitude of the output value of the photodetector 19c representing the intensity of the spot 17c of the incident converged light beam. In this example, there is no need to perform calculations with the photodetector 19c divided into multiple areas. That is why the photodetector 19c can be positioned more easily with respect to the spot 17c of the converged light beam.

Each recording layer 1 includes a material that absorbs the laser beam at an increasing absorptance as the absorption edge of a light absorption spectrum shifts, with a rise in temperature, toward a longer wavelength range as a result of a band-to-band transition of electrons. The recording layer 1 may have a dual-layer structure consisting of a variable absorption film that causes the absorption edge shifting phenomenon and a recording film with high transmittance, which is arranged adjacent to the variable absorption film. Alternatively, the recording layer 1 may have a single-layer structure consisting of only a recording film that causes the absorption edge shifting phenomenon with no variable absorption films. Still alternatively, in order to increase the environmental stability or improve the optical properties, dielectric films such as a ZnS—SiO$_2$ film and an AlN film may be stacked on one or both sides of such a film that causes the absorption edge shifting phenomenon.

As a material that causes the absorption edge shifting phenomenon at a wavelength λ that satisfies 0.39 μm≦λ≦0.42 μm, ZnO, a Bi—O based material such as $Bi_2O_3$, a Ce—O based material such as $CeO_2$, or a material mainly composed of any of these compounds is a promising candidate. Each of these materials can be used in the form of a thin film that has been deposited by sputtering or evaporation process. As used herein, "mainly composed of" refers to an ingredient that accounts for 50 mol % of a material.

Among various Bi—O based materials, $Bi_2O_3$ with the stoichiometric composition is preferred to realize a multi-layer information recording medium because its transmittance is higher than any other Bi—O based material, theoretically speaking. However, if a $Bi_2O_3$ film is deposited by sputtering, for example, its composition could slightly deviate from the stoichiometric one and it would be difficult to realize an exactly stoichiometric composition in that case.

The present inventors discovered that even if $Bi_2O_x$ had a composition that was slightly different from its stoichiometric one but satisfied 2.7≦x<3 or 3<x<3.3, the decrease in transmittance was relatively small and could be at most within several percent per layer by using that $Bi_2O_x$ as a main ingredient of that material. As a result, the absorption edge shifting phenomenon occurred as intended and the recording operation could get done with high sensitivity with the transmittance per recording layer 1 kept as high as 80-95%. Consequently, $Bi_2O_x$ falling within that range could be used effectively as a recording layer material for a multilayer information recording medium with a relatively large number of (e.g., six to twenty) recording layers.

With $Bi_2O_x$ in which x>3.3, the film became yellowish, and the greater the mole fraction x, the more steeply the transmittance at a wavelength of 0.39 μm to 0.42 μm decreased. On the other hand, with $Bi_2O_x$ in which x<2.7, the film became blackish, and the smaller the mole fraction x, the more steeply the transmittance of the film decreased. And on either condition, as the degree of absorption increased due to an increasing deviation from the stoichiometry, the effect of increasing the sensitivity by the occurrence of the absorption edge shifting phenomenon gradually wore off.

The present inventors also discovered that $Bi_2O_3$, $Bi_2O_x$ (where 2.7≦x<3 or 3<x≦3.3) or a material mainly composed of any of these turned polycrystalline at a temperature of 250-350° C. That is to say, in that case, the single-layer structure described above (in which a single film functions as both a variable absorption film and a recording film) could, and should rather, be used to simplify the structure of the recording layer 1.

Hereinafter, the structure of the information recording medium 21 of this preferred embodiment will be described in detail. FIG. 4(a) illustrates the information recording medium 21 of this preferred embodiment and FIG. 4(b) illustrates the structure of one (e.g., the recording layer 1b in the example illustrated there) of multiple recording layers 1 that the information recording medium 21 has.

The information recording medium 21 has a multilayer structure in which a number of (e.g., six in the example illustrated in FIG. 4) recording layers 1 and a number of space layers 2 are alternately stacked one upon the other. Each of those recording layers 1 includes a recording film 33, which is made of either $Bi_2O_x$ that satisfies 2.75≦x<3 or 3<x≦3.3 or a material mainly composed of such $Bi_2O_x$ as described above.

Each recording layer 1 further includes a first dielectric film 32, which has a higher melting point than the recording film 33 and includes no S, and a second dielectric film 31 including ZnS. The recording film 33, the first dielectric film 32 and the second dielectric film 31 are stacked in this order (toward the direction from which the converged light beam 7 is coming in the example illustrated in FIG. 4). A reflective layer 30 is further arranged adjacent to the recording film 33 and opposite to the dielectric films 31 and 32. The lowest recording layer if was made of a metal mainly composed of Ag such as AgBi or AgPdCu to increase the reflectance, but the other recording layers 1a through 1e were made of a dielectric with some degree of transparency such as AlN. Among other things, AlN is particularly preferred because it has not only a high degree of transparency but also high thermal conductivity, and therefore, would improve the recording performance in terms of power margin, for example.

By sandwiching the recording film 33 between such dielectric films and other films as described above, not only the environmental stability but also the recording performance such as the degree of modulation can be improved.

A material mainly composed of ZnS is preferably used for the dielectric films for the following reasons. First of all, as such a material has low thermal conductivity, high sensitivity can be achieved easily using it. In addition, as it also has a high degree of transparency, a multilayer dielectric film can be formed easily using such a material. On top of that, it can be deposited at so high a rate as to contribute to mass production greatly.

The present inventors discovered that if the recording film 33 was made of such a Bi—O based material and one or both of the dielectric films sandwiching the recording film were made of a material including S such as ZnS and if recording marks were formed continuously on the single recording layer 1, the transmittance decreased significantly by approximately 13% on average. As for the marks themselves recorded in the recording film 33, the transmittance decreased three to four times as significantly as the average (e.g., by as much as 39-42%), and therefore, the recording operation could not get done as intended on portions of the recording layer that were located under those recording marks. For that reason, the smaller the decrease in transmittance after the recording operation, the better.

As a result of analysis, the present inventors discovered that the generation of polycrystalline $Bi_2O_2S$ was observed in the recording marks that had been left in the recording film 33 and that $Bi_2O_2S$ had poor transmittance. Such crystals were produced probably because S would have flowed from the dielectric films into the recording film 33 and bonded to the Bi—O material during the recording operation.

The present inventors discovered that by interposing a dielectric film having a higher melting point than the recording film 33, including no S (i.e., the first dielectric film 32) and having as small a thickness as 3-10 nm between the recording film 33 made of a Bi—O based material and the dielectric film including S such as ZnS (i.e., the second dielectric film 31), not only could that overflow of S be avoided but also could the recording performance be improved. By eliminating the overflow of S, the decrease in transmittance after recording marks had been formed continuously could be limited to the range of 2-3% or less. What is more, if the melting point of the material of the first dielectric film was higher than that of the recording film (e.g., 800-900° C. in the Bi—O based material, for example), the deformation of the dielectric film 32 could be minimized while the recording marks were formed on the recording film 33, and the resultant recording performance improved as well.

It is not impossible to insert another dielectric film between the first and second dielectric films 32 and 31. However, it is preferred that the first dielectric film 32 and the recording film 33 be stacked with no layers interposed between them because the resultant recording performance would be better in that case.

Optionally, the recording film 33 may have a dual-layer structure consisting of a variable absorption film 33a and a high transmittance recording film 33a that has been stacked directly on it as shown in FIG. 4(c).

The structure shown in FIG. 4(b) will be further described. In the information recording medium of this preferred embodiment, the first dielectric film 32 is made of $ZrSiO_4$ with as high a melting point as 2,500° C. and with a sufficiently high degree of transparency. Alternatively, at least one compound selected from the group consisting of $ZrO_2$, $Y_2O_3$, $HfO_2$, $Al_2O_3$, ALN, $CeO_2$, $Dy_2O_3$ and MgO could also be used as a main ingredient of the material for the first dielectric film 32 because each of these compounds has a sufficiently high degree of transparency and a melting point of 2,000° C. or more, which is much higher than that of the recording film 33.

Also, the second dielectric film 32 is preferably mainly composed of ZnS—$SiO_2$, which is ZnS including 10-30 mol % of $SiO_2$ because the crystallization of ZnS itself can be prevented and the environmental stability can be increased.

The present inventors also discovered that if an appropriate amount of Ge was added to the $Bi_2O_3$ or $Bi_2O_x$ (where $2.7 \leq x < 3$ or $3 < x \leq 3.3$) material and used as the material for the recording film 33, the absorption edge shifted to a shorter wavelength range, the transmittance increased, and the degree of uniformity of crystallinity increased. We further discovered that the material to which Ge had been added produced the recording action by turning the material including Bi, Ge and O into a polycrystalline material. If the amounts of Ge added were changed, the resultant property varied according to that amount of Ge added. Specifically, the larger the amount of Ge added, the higher the temperature of crystallization. As a result, the sensitivity would decrease but the environmental stability would increase. If Ge was added at an atomic number ratio of 1/24 to 1/9 with respect to Bi, the degree of transparency increased. But if the amount of Ge added surpassed that range, then the absorptance increased and the recording film became opaque. Furthermore, if Ge was added at an atomic number ratio of 1/44 to 1/24, the degree of transparency did not change so much but some increase in crystallization rate could be confirmed. For example, if Ge was added at atomic number ratios of 1/44 and 1/24 with respect to Bi, generation of polycrystalline $Bi_{44}GeO_{68}$ and polycrystalline $Bi_{24}GeO_{38}$ could be confirmed as a result of, analysis.

The present inventors further discovered that by adding an appropriate amount of Ge to $Bi_2O_3$ or $Bi_2O_x$ (where $2.7 \leq x < 3$ or $3 < x \leq 3.3$) material and using it as the material for the recording film 33, the decrease in transmittance after the recording operation could be limited.

FIGS. 5 to 8 show the resultant transmittances that were measured by irradiating a sample, having the same stack of films (i.e., ZnS—$SiO_2$/$ZrSiO_4$/$Bi_2O_3$-M/AlN (where M is an additive)) on a glass substrate as the information recording medium of this preferred embodiment, with light having a wavelength satisfying $0.39 \mu m \leq \lambda \leq 0.42 \mu m$ (e.g., $0.407 \mu m$) with its temperature increased. Based on results of this experiment, the magnitude of decrease in the transmittance of recording marks that were formed on the recording layer 1 of the information recording medium 21 can be estimated.

Figure 5:
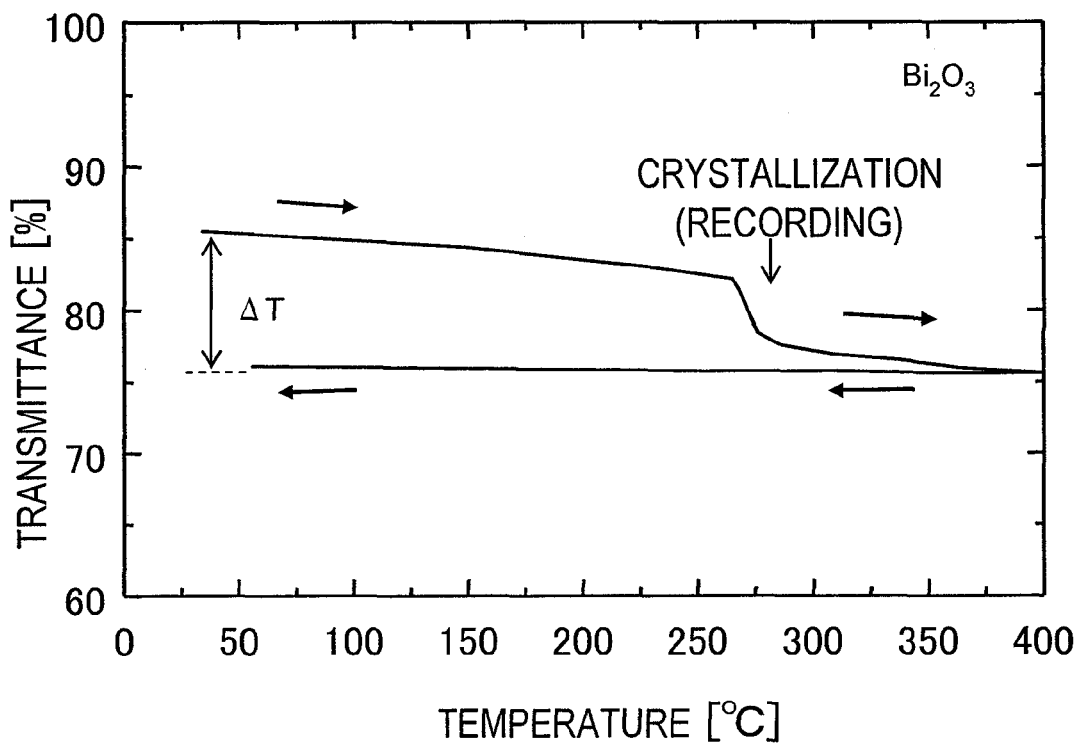
FIG. 5 shows how the transmittance changes with the temperature in the information recording medium as the first preferred embodiment of the present invention.

FIG. 5 shows the results of measurement that were obtained in a situation where the recording film 33 was made of simply $Bi_2O_3$ with no additives at all. As the temperature rose, the transmittance that was 85.5% at room temperature gradually decreased (because absorption increased due to the absorption edge shifting phenomenon). And at a temperature of approximately 270° C., a decrease of about 5% in transmittance due to the crystallization of the recording film 33 was confirmed. Thus, the recording action would have been produced (i.e., recording marks would have been formed) at that temperature as a result of the transition of the recording film from the amorphous state into the crystalline state. Thereafter, if the temperature was raised to 400° C., which was almost as high as the recording temperature, and then lowered to almost room temperature, the transmittance decreased by $\Delta T = 9.5\%$. That is why the transmittance of the recording marks would also have decreased by 9.5% and an estimated decrease in transmittance after the recording marks had been formed continuously on the information recording medium should be in the range of 2.4-3.2% on average.

Figure 6:
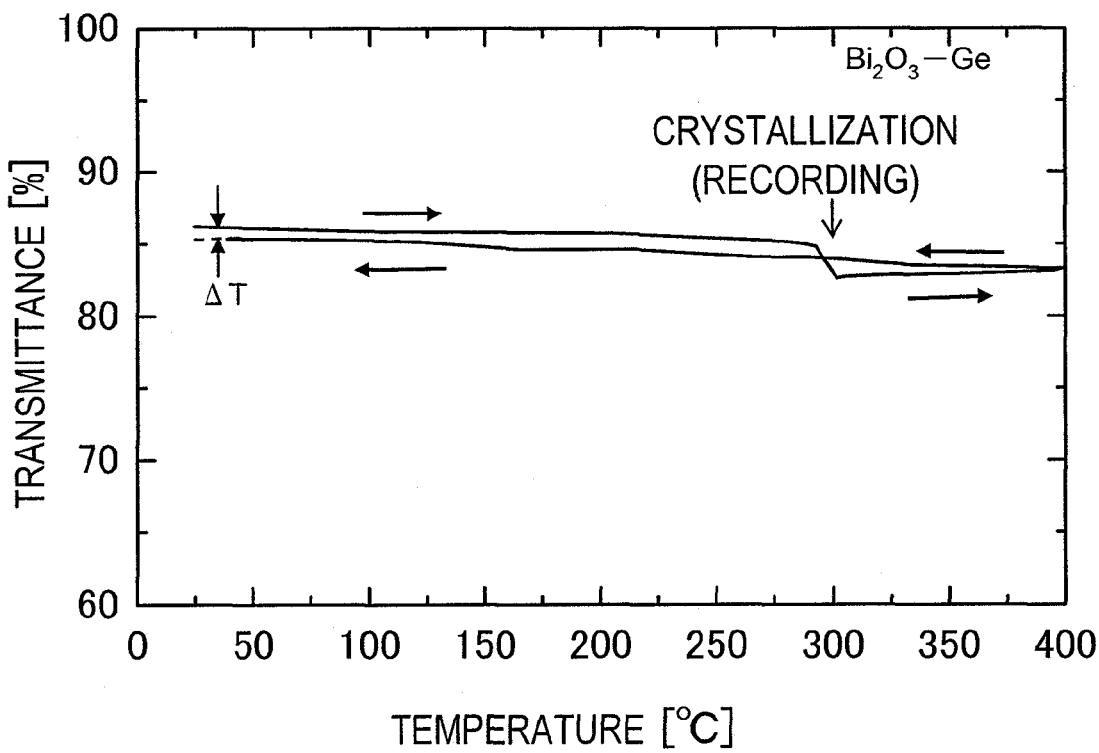
FIG. 6 shows how the transmittance changes with the temperature in the information recording medium as the first preferred embodiment of the present invention.

FIG. 6 shows the results of measurement that were obtained in a situation where the recording film 33 was made of $Bi_2O_3$ including Ge as an additive at an atomic number ratio of approximately 1/24 with respect to Bi. The transmittance also decreased gradually as the temperature rose. And a steep decrease in transmittance due to the crystallization of the recording film 33 was also confirmed in the vicinity of 300° C. However, as the temperature was raised to 400° C. after that, the transmittance increased gradually to recover, to a certain degree, the decrease in transmittance due to the crystallization. And when the temperature was lowered to the vicinity of room temperature, the decrease $\Delta T$ in transmittance was 0.9% as shown in FIG. 6. Thus, it was discovered that the decrease in transmittance was much less than the situation where no Ge was added at all.

The estimated decrease in transmittance after recording marks had been formed continuously on the information recording medium should be zero point several percent on average. That is to say, the transmittance would hardly be decreased even by forming the recording marks. The larger the amount of Ge added, the more steeply the transmittance increased due to a rise in temperature after the crystallization. That is why there is the best amount of Ge that should be added to recover the decrease caused by the crystallization. Although it depends on the layered structure of the recording film, the best amount of Ge added turned out to have an atomic number ratio of approximately 1/24 to 1/12 with respect to Bi.

Various other elements were added as an experiment. As a result, the present inventors discovered that when Nb, Ta or Ir was added, the resultant transmittance could be represented by the same curve as what is shown in FIG. 6. That is why the material with any of these additives is a promising candidate material for the recording film of a multilayer information recording medium. The preferred amount of such a material to add turned out to be defined by an atomic number ratio of approximately 1/44 to 1/9 with respect to Bi.

Figure 7:
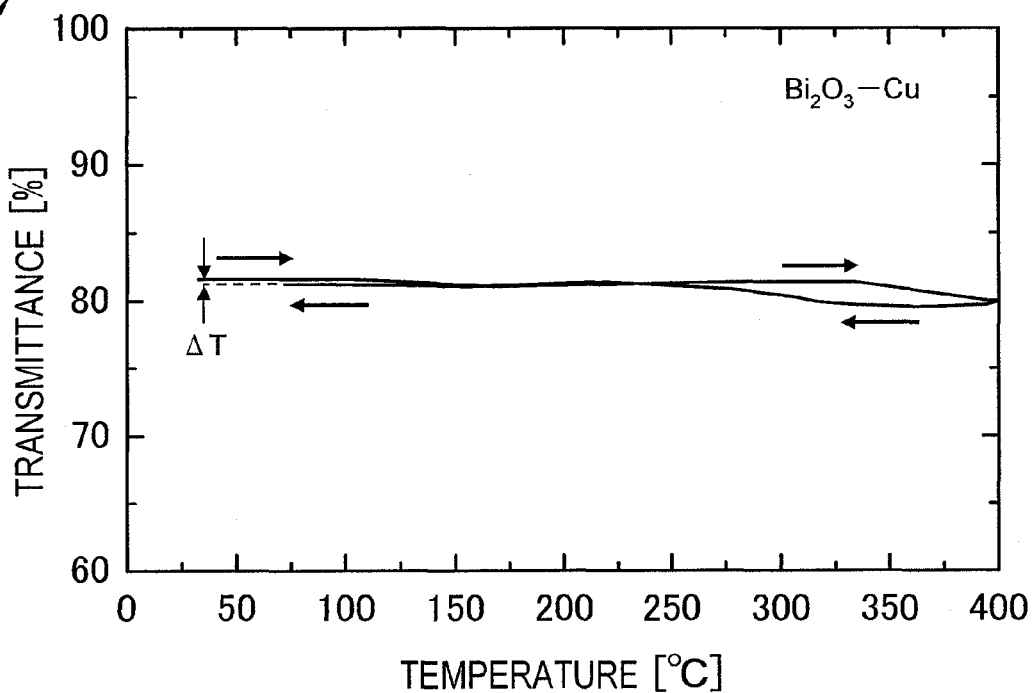
FIG. 7 shows how the transmittance changes with the temperature in the information recording medium as the first preferred embodiment of the present invention.

FIG. 7 shows the results of measurement that were obtained in a situation where the recording film 33 was made of $Bi_2O_3$ including Cu as an additive at an atomic number ratio of approximately 1/12 with respect to Bi. In this case, even if the temperature was raised, the transmittance never decreased due to the crystallization of the recording film 33. And if the temperature was raised to 400° C. and then lowered to approximately room temperature after that, the decrease ΔT in transmittance turned out to be 0.5% as shown in FIG. 7. Thus, it was discovered that the decrease in transmittance could be much less than the situation where nothing was added. The estimated decrease in transmittance after recording marks had been formed continuously on the information recording medium should be in the range of approximately 0.1-0.2% on average. That is to say, the transmittance would hardly be decreased even by forming the recording marks. Although it depends on the layered structure of the recording film, the best amount of Cu added turned out to have an atomic number ratio of approximately 1/24 to 1/12 with respect to Bi. The present inventors confirmed via an acceleration test that the environmental stability also increased in this case.

Various other elements were added as an experiment. As a result, the present inventors discovered that when Mo, W, Cr or Ni was added, the resultant transmittance could be represented by the same curve as what is shown in FIG. 7. That is why the material with any of these additives is a promising candidate material for the recording film of a multilayer information recording medium. The preferred amount of such a material to add also turned out to be defined by an atomic number ratio of approximately 1/44 to 1/9 with respect to Bi.

Figure 8:
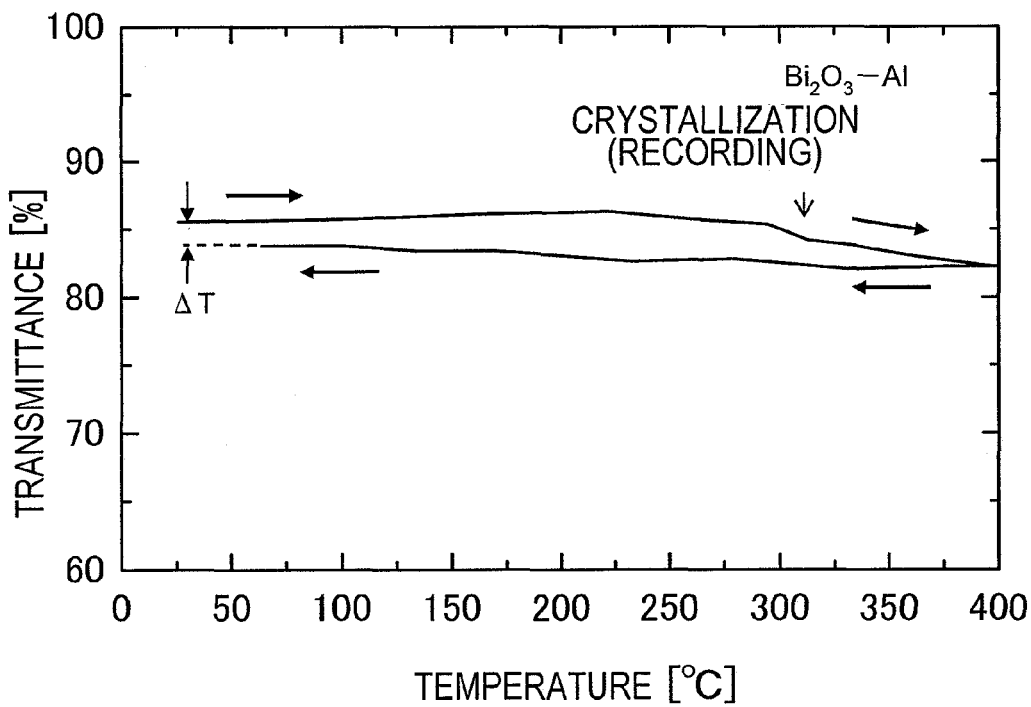
FIG. 8 shows how the transmittance changes with the temperature in the information recording medium as the first preferred embodiment of the present invention.

FIG. 8 shows the results of measurement that were obtained in a situation where the recording film 33 was made of $Bi_2O_3$ including Al as an additive at an atomic number ratio of approximately 1/12 with respect to Bi. In this case, as the temperature was raised, the transmittance decreased much less significantly (e.g., by approximately a half as much as in the situation where Ge was added) due to the crystallization of the recording film 33. And if the temperature was raised to 400° C. and then lowered to approximately room temperature after that, the decrease ΔT in transmittance turned out to be 1.7% as shown in FIG. 8. Thus, it was discovered that the decrease in transmittance could be much less than the situation where nothing was added. The estimated decrease in transmittance after recording marks had been formed continuously on the information recording medium should be in the range of approximately 0.4-0.6% on average. That is to say, the transmittance would hardly be decreased even by forming the recording marks. Although it depends on the layered structure of the recording film, the best amount of Al added turned out to have an atomic number ratio of approximately 1/24 to 1/12 with respect to Bi.

The present inventors discovered that when Co, Ru or Rh was added, the resultant transmittance could be represented by the same curve as what is shown in FIG. 8. That is why the material with any of these additives is a promising candidate material for the recording film of a multilayer information recording medium. The preferred amount of Co, Ru or Rh to add also turned out to be defined by an atomic number ratio of approximately 1/44 to 1/9 with respect to Bi.

Also, if Si was added to $Bi_2O_3$, the transmittance of the recording film increased by several percent and an even larger number of recording layers could be stacked one upon the other. The preferred amount of Si to add also turned out to be defined by an atomic number ratio of approximately 1/44 to 1/9 with respect to Bi.

As described above, the recording film 33 preferably includes, as an additive, at least one element selected from the group consisting of Ge, Nb, Ta, Cu, Mo, W, Cr, Al, Si, Ir, Ni, Co, Ru and Rh and the amount of that additive is preferably defined by an atomic number ratio of 1/44 to 1/9 with respect to Bi.

The present inventors also confirmed that substantially the same effect was achieved by adding any of the elements described above to a recording film of $Bi_2O_x$ (where $2.7 \leq x < 3$ or $3 < x \leq 3.3$), not just the recording film of $Bi_2O_3$.

Furthermore, when the present inventors performed a reproduction/recording operation on an information recording medium with six recording layers, which was actually made using such a recording film including any of the additives described above, we confirmed that the reproduction/recording operation could get done just as intended.

The present inventors also discovered that with the structure shown in FIG. 4(b) in which the first dielectric film 32 is arranged between the recording film 33 and the second dielectric film 31, even if $Bi_2O_x$ failed to satisfy $2.7 \leq x < 3$ or $3 < x \leq 3.3$, good reproduction/recording performance could still be accomplished.

Hereinafter, it will be described with reference to FIG. 9 how the absorptance varies according to the temperature of the information recording medium of this preferred embodiment. For the sake of simplicity, suppose the wavelength of the light for recording is constant (i.e., there is no wavelength variation) and the information recording medium 21 has a single-layer structure in which there is only one recording layer 1 sandwiched between two space layers 2. The only one recording layer 1 is supposed to have a three-layer structure in which a dielectric film of ZnS—$SiO_2$ (eight to two) with a thickness of 50 nm, a recording film of $Bi_2O_3$ with a thickness of 80 nm, and another dielectric film of ZnS—$SiO_2$ (eight to two) with a thickness of 20 nm are stacked one upon the other in this order from the light incident side (i.e., so that the former dielectric film is located closest to the objective lens 6), i.e., a structure in which the recording film is sandwiched between the two dielectric films. The space layers were made of a UV curable resin, for example. This information recording medium 21 has an H to L property so that the reflectance of a recorded portion will decrease when something is recorded on it.

It should be noted that the variation in absorptance shown in FIG. 9 occurred mostly inside the $Bi_2O_3$ recording film causing the absorption edge shifting phenomenon. That is why even if the arrangement of dielectric layers with high transmittance or the material of the space layers is changed but if the material causing the absorption edge shifting phenomenon remains the same, the extinction coefficient of that material would vary in substantially the same pattern, and therefore, the information recording medium 21 would have almost the same rate of increase in absorptance.

Hereinafter, the variation in absorptance will be described more specifically. First of all, at room temperature (e.g., 25° C.), the information recording medium 21 had an absorptance of 8.2%, for example. With such an initial state supposed to be a reference state, a test recording operation is performed on the information recording medium 21 and the light source power control section 28 determines the power P0 of the light source 20 based on the result of the test recording operation. As more and more heat was generated inside the optical information reproduction/recording apparatus, the overall temperature of the information recording medium 21 rose and the absorption edge shifting phenomenon occurred accordingly, thus increasing the absorptance (e.g., linearly increasing the absorptance up to approximately 130° C.). As a result, at a temperature of 45° C., for example, the absorptance was 8.8%. That is to say, when the temperature varied by $\Delta T=20°$ C., the absorptance increased 1.07 times. And if the absorptance increased, the recording sensitivity would also increase to approximately the same degree. That is why to keep the recording sensitivity of the information recording medium 21 substantially constant, the recording power P should be 0.93 (=1/1.07) times, i.e., P=0.93P0 should be satisfied. As can be seen, if the variation in the temperature of the information recording medium 21 can be sensed, the variation in its recording sensitivity can be estimated. And if the power of the light source 20 is reduced by the light source power control section 28 to compensate for that variation, the recording sensitivity can be kept substantially constant with respect to the information recording medium 21.

Even if either $Bi_2O_x$ (where $2.7 \leq x < 3$ or $3 < x \leq 3.3$) or a material mainly composed of $Bi_2O_x$ was used as an alternative recording film material instead of $Bi_2O_3$, the absorptance also increased approximately 1.07 times as a result of a temperature variation $\Delta T=20°$ C. Thus, the control operation may be performed so that the factor of proportionality k2 becomes 0.054(=1.07/20) and that the power of the light source 20 becomes $1/(k2\Delta T)$ times (i.e., $P=P0/(k2\Delta T)$ is satisfied).

The recording power actually has a power margin. And it is generally believed that if the power margin is within 10%, optical properties such as jitter and mars would fall within practical ranges. For that reason, even if the recording power control described above is not performed sequentially but is performed only to fall within the power margin range (i.e., $0.9P0/(k2\Delta T) \leq P \leq 1.1P0/(k2\Delta T)$, it can be said the resultant optical properties should fall within the practical ranges.

Next, the respective wavelength dependences of the absorptance, reflectance and transmittance in the information recording, medium of this preferred embodiment will be described with reference to FIG. 10. In the following description, the temperature of the information recording medium 21 is supposed to never vary (i.e., remain at room temperature) and also supposed to have the same single-layer structure as what has been described above for the sake of simplicity.

As the wavelength increases, the absorptance of the recording layer 1 of the information recording medium 21 decreases but the transmittance and reflectance thereof increase. Consequently, the recording sensitivity would decline due to the decrease in absorptance but the reproduction sensitivity would rise due to the increase in reflectance.

For example, at room temperature (e.g., 25° C.), the information recording medium 21 had an absorptance of 8.2%. With such an initial state supposed to be a reference state, a test recording operation is performed on the information recording medium 21 and the light source power control section 28 determines the recording power P0 of the light source 20 based on the result of the test recording operation. If the wavelength increased by 1 nm (corresponding to a situation where the temperature of the light source 20 in the optical information reproduction/recording apparatus rose by approximately 20° C.), the absorptance decreased to 7.6%, for example. And if the wavelength increased by 2 nm, the absorptance dropped to 7.1%. That is to say, if the wavelength increased by 1 nm, the recording sensitivity would decrease to 0.93 (=7.6/8.2). Thus, the factor of proportionality k1 would increase 1.08 (=1/0.93) times. Consequently, to keep the recording sensitivity of the information recording medium 21 substantially constant, the recording power should be multiplied by $k1\Delta\lambda$, i.e., so that $P=P0k1\Delta\lambda$ is satisfied.

If the magnitude of variation $\Delta\lambda$ in the wavelength of the light source 21 is detected, the variation in the recording sensitivity of the information recording medium 21 can be estimated. And by getting the power of the light source 20 increased by the light source power control section 28 accordingly, the recording sensitivity of the information recording medium 21 can be kept substantially constant. For example, if the magnitude of the wavelength variation detected is identified by $\Delta\lambda$, the variation in absorptance becomes substantially linear when the magnitude of the wavelength variation is in the vicinity of 1 nm. That is why the control operation should be performed so as to increase the power of the light source 20 by the factor of approximately $k1\Delta\lambda$, i.e., so that $P=P0k1\Delta\lambda$ is satisfied. On the other hand, if the magnitude of the wavelength variation is greater than several nm, then the k1 value needs to be determined and the power of the light source 20 needs to be controlled so that the absorptance becomes substantially constant and traces the absorption curve shown in FIG. 10.

In this case, there will be practically no problem, either, if the control operation is performed within the range $0.9P0 k1\Delta\lambda \leq P \leq 1.1P0 k1\Delta\lambda$ with the power margin set to be ±10%.

In the foregoing description, the variation in the temperature of the information recording medium 21 and the variation in the wavelength of the light for reproduction or recording have been description separately from each other. Actually, however, the variation in the temperature of the information recording medium 21 and the variation in wavelength should occur concurrently. That is why the power of the light source 20 should be controlled by the light source power control section 28 with the respective outputs of the wavelength detecting section 26 and the medium temperature sensing section 27 taken into account as a whole. In practice, there will be no problem if the power falls within the range with a power margin of ±10%. Suppose, in performing a recording operation, if the variation in the wavelength of the light for recording from its value in a reference state is identified by $\Delta\lambda$, the variation in the temperature of the information recording medium itself or its ambience from its value in the reference state is identified by $\Delta T$, their factors of proportionality are identified by k1 and k2, respectively, and the power of the light source in the reference state is identified by P0. In that case, if the power P of the light source is controlled so as to satisfy $0.9P0 (k1\Delta\lambda)/(k2\Delta T) \leq P \leq 1.1P0 (k1\Delta\lambda)/(k2\Delta T)$, then the recording sensitivity can be kept substantially constant and the recording operation can get done with stability.

Suppose an information reproduction/recording apparatus is used continuously for a relatively long time to perform a reproduction/recording operation. In that case, if the information reproduction/recording apparatus is put in a single housing, the temperature in the housing will rise and soon get saturated at a particular temperature (of 45° C., for example). In such a situation, suppose the temperature of the light source section 20 and that of the information recording medium 21 itself have both varied by approximately 20° C. through a period of time from when they started to be used (i.e., in the reference state) through when they are being used continuously. Also, suppose $Bi_2O_3$, $Bi_2O_x$ (where $2.7 \leq x < 3$ or $3 < x \leq 3.3$) or a material mainly composed of such $Bi_2O_x$ is used as a material for the recording film, the recording power is increased by the factor of 1.08 in response to the increase of 20° C. in the temperature of the light source section 20 (corresponding to the increase of 1 nm in wavelength) and the recording power is multiplied by the factor of 0.93 in response to the increase of 20° C. in the temperature of the information recording medium 21. Taking these factors into consideration as a whole, the present inventors discovered that the ideal variation in recording power was $(k1\Delta\lambda)/(k2\Delta T)=1.08\Delta\lambda/0.054 \Delta T=1$, i.e., the recording power did not have to be varied at all.

From a physical point of view, this result was obtained because both the variation in the wavelength of the light source 20 and the variation in the absorptance of the recording layer of the information recording medium 21 should have been caused by the absorption edge shifting phenomenon in principle and would have managed to cancel each other successfully. Speaking more generally, even if another material that would also cause the absorption edge shifting phenomenon is used for the information recording medium 21 instead of $Bi_2O_3$ or the $Bi_2O_x$ (where $2.7 \leq x < 3$ or $3 < x \leq 3.3$) material, the same result would be obtained as long as the principle remains the same.

Nevertheless, if the information reproduction/recording apparatus is used for just a short time, the variation in the temperature of the light source 20 would tend to be greater than the variation in the temperature of the information recording medium 21. In that case, taking these factors into account as a whole, the recording power would tend to increase consequently. Furthermore, if the information reproduction/recording apparatus has been used for a relatively long time and if the information recording medium 21 has been replaced with another one (and if such a situation is supposed to be the "reference state"), the variation in the temperature of the light source 20 would tend to be less than the variation in the temperature of the information recording medium 21. In that case, taking these factors into account as a whole, the recording power would tend to decrease consequently.

Next, it will be described briefly what to do when a reproduction operation is performed. Even so, as in the case of recording, the power of the light source 20 just needs to be controlled so as to keep the reproduction sensitivity constant. Although not shown, as the temperature of the information recording medium 21 rises, the reflectance will decrease if the information recording medium is designed to have the H to L property. In that case, the readout power should be increased accordingly. On the other hand, if the wavelength of the light for reproduction increases, then the reflectance will increase as can be seen from FIG. 10, and therefore, the readout power should be decreased to compensate for the increase. Normally, however, the variation in the temperature of the information recording medium 21 and the variation in the wavelength of the light for reproduction should occur concurrently. That is why the control operation just needs to be performed so that the power of the light for reproduction falls within the range with a margin of 10% overall.

Next, it will be described what if the information recording medium 21 is designed to have an L to H property so that a recorded portion will have an increased reflectance, as opposed to the information recording medium of the first preferred embodiment of the present invention described above. FIG. 11 is a graph showing how the absorptance, reflectance and transmittance vary with the wavelength of the light for reproduction or recording in an information recording medium with a different structure from the counterpart of the first preferred embodiment of the present invention described above. The information recording medium 21 has a single-layer structure in which only one recording layer 1 is vertically sandwiched between two space layers 2. The only one recording layer 1 may consist of only a $Bi_2O_3$ recording film with a thickness of 80 nm. And a UV curable resin, for example, may be used as a material for the space layers.

While a recording operation is being performed, the recording sensitivity varies in the same way as in the medium with the H to L property, and therefore, the power of the light source may be controlled just as described above. But while a reproduction operation is being performed, it is a quite different story as will be described later. Although not shown, as the temperature of the information recording medium 21 rises, the reflectance will increase if the information recording medium is designed to have the L to H property. In that case, the readout power should be decreased accordingly. On the other hand, if the wavelength of the light for reproduction increases, then the reflectance will rather decrease as can be seen from FIG. 11, and therefore, the readout power should be increased to compensate for the decrease. Normally, however, the variation in the temperature of the information recording medium 21 and the variation in the wavelength of the light for reproduction should occur concurrently. That is why the control operation just needs to be performed so that the power of the light for reproduction falls within the range with a margin of 10% overall.

Suppose, in performing a reproduction operation, the variation in the wavelength of the light for reproduction from its value in a reference state is identified by $\Delta\lambda$, the variation in the temperature of the information recording medium itself or its ambience from its value in the reference state is identified by $\Delta T$, their factors of proportionality are identified by k1 and k2, respectively, and the power of the light source in the reference state is identified by P0. In that case, if the information recording medium has an L to H property, the power P of the light source is controlled so that the power P satisfies $0.9P0\ (k1\Delta\lambda)/(k2\Delta T) \leq P \leq 1.1P0\ (k1\ \Delta\lambda)/(k2\Delta T)$. But if the information recording medium has an H to L property, the power P of the light source is controlled so that the power P satisfies $0.9P0\ (k2\Delta T)/(k1\Delta\lambda) \leq P \leq 1.1P0\ (k2\Delta T)/(k1\Delta\lambda)$. By performing the control operation in this manner, the reproduction sensitivity can be kept substantially constant. In the example illustrated in FIG. 10, k1=1.1. Even when a reproduction operation was performed, however, k1 and k2 could be set to be 1.08 and 0.054, respectively, which were the same values as the ones used for recording.

Another preferred reproduction/recording method will be described. First of all, in the earliest stage, a test recording operation is performed on the information recording medium 21. Based on the result of the test recording operation, the light source power control section 28 determines the power of the light source 20 in the reference state. The outputs of the wavelength detecting section 26 and the medium temperature sensing section 27 in the reference state will be referred to herein as "Reference Output #1" and "Reference Output #2", respectively. If either the output of the wavelength detecting section 26 or that of the medium temperature sensing section 27 exceeds a certain predetermined value (e.g., a power margin of 10% or less) with respect to the reference output, a test recording operation is performed again on the information recording medium 21. And based on the result of the test recording operation, the light source power control section 28 changes the powers of the light source. According to this method, the variation in the sensitivity of the information recording medium 21 can be compensated for accurately, and the reproduction/recording operation can get done with stability.

The light source power control section 28 of the optical information reproduction/recording apparatus of this preferred embodiment includes a storage section 34 that stores the methods for controlling the power of the light source 20 based on the output of the wavelength detecting section 26 and based on the output of the medium temperature sensing section 27, respectively. The light source power control section 28 controls the power of the light source 20 by the method for controlling the power of the light source 20 described above. For example, it will be effective if the factors of proportionality k1 and k2 and the power control range described above and so on are stored in the storage section 34.

The information recording medium 21 of this preferred embodiment stores sensitivity information about a variation in reproduction or recording sensitivity that has been caused by the variation in the wavelength of the laser beam and the variation in the temperature of the information recording medium 21 itself or its ambience. The sensitivity information may be stored as a piece of disc information on the recording layer (identified by if in the example shown in FIG. 1) that is located most distant from the objective lens, for example. In that case, it can be seen that the sensitivity of the information recording medium 21 varies according to the respective outputs of the wavelength detecting section 26 and the medium temperature sensing section 27. As a result, the reproduction/recording operation can get done with stability by getting the power of the light source 20 controlled by the light source power control section 28 differently from any other information recording medium. In addition, by storing the sensitivity information on the recording layer if that is located most distant from the objective lens, that information can be retrieved safely in spite of any variation in the environment.

Optionally, the sensitivity information stored may just indicate whether or not the reproduction or recording sensitivity ever varies in response to the variation in the wavelength of the laser beam and the variation in the temperature of the information recording medium itself or its ambience. In that case, an information recording medium, of which the reproduction or recording sensitivity does vary, can be distinguished from the other information recording media, of which the sensitivity never varies. Furthermore, the sensitivity information may include information about a relation between the variation in the wavelength of the laser beam or the variation in the temperature of the information recording medium itself or its ambience and a variation in the reproduction or recording sensitivity (e.g., the factors of proportionality k1 and k2 and the power control range). By storing the factors of proportionality k1 and k2 and the power control range on the information recording medium 21, even if the materials that cause the absorption edge shifting phenomenon have been changed, the power of the light source 20 can be controlled accurately according to the type of that material.

(Embodiment 2)

Figure 12:
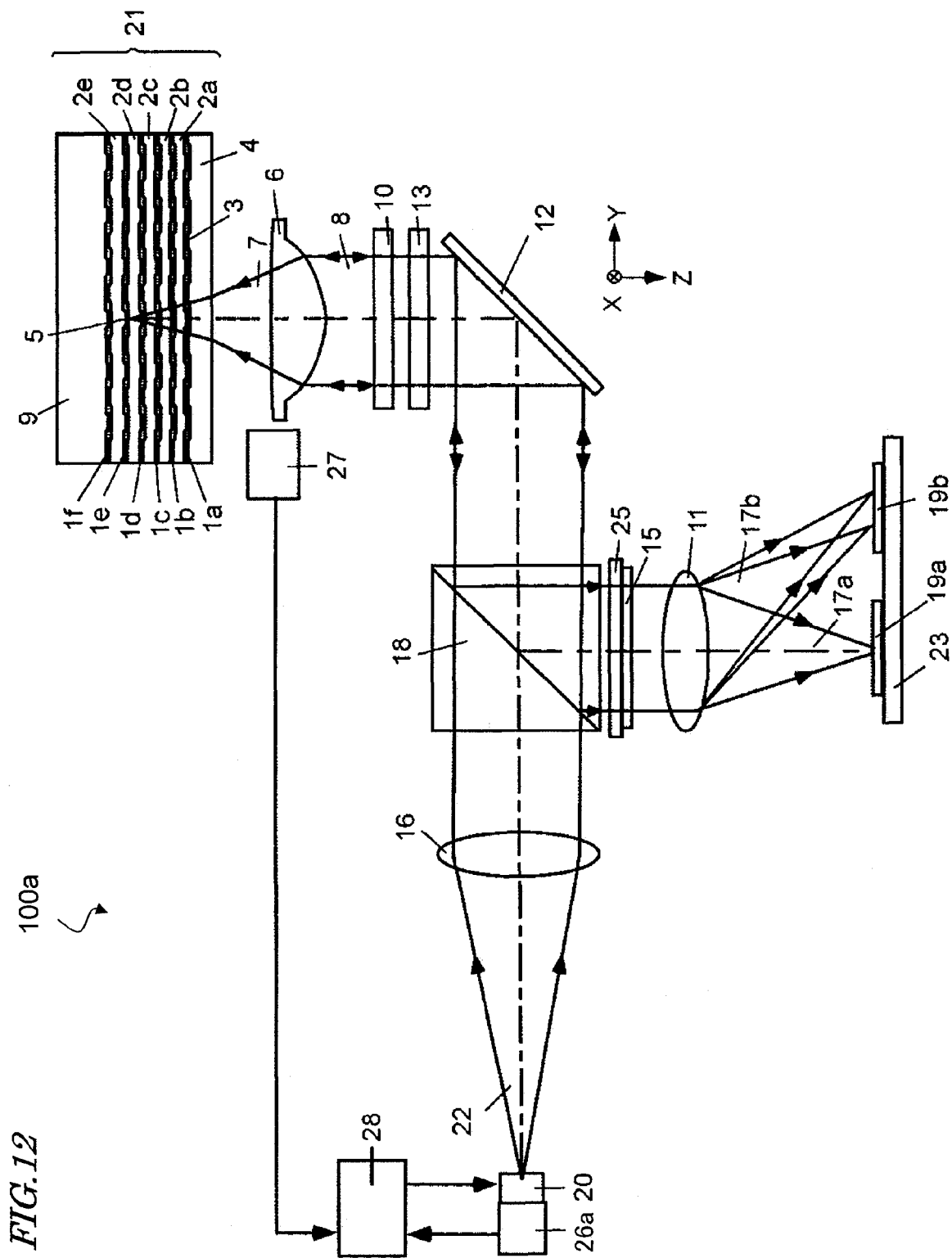
FIG. 12 illustrates the arrangement of an optical information reproduction/recording apparatus as a second preferred embodiment of the present invention and also illustrates how to reproduce or record a signal from/on an information recording medium.

Hereinafter, an optical information reproduction/recording apparatus as a second specific preferred embodiment of the present invention will be described with reference to FIG. 12. The following description will be focused on its differences from the optical information reproduction/recording apparatus of the first preferred embodiment described above. FIG. 12 illustrates the arrangement of the optical information reproduction/recording apparatus 100a as the second preferred embodiment of the present invention and also illustrates how to reproduce or record a signal from/on the information recording medium 21.

What is different from the optical information reproduction/recording apparatus 100 of the first preferred embodiment is the configuration of the wavelength detecting section. Specifically, in the optical information reproduction/recording apparatus 100a of the second preferred embodiment, the wavelength detecting section 26a has a structure in which a temperature sensor such as a thermistor for sensing the temperature of the light source 20 itself or its ambience with or without its variation is arranged thermally in contact with the light source section 20. The wavelength detecting section 26a does not directly detect the wavelength of the light for reproduction or recording or its variation but estimates the magnitude of the wavelength variation by sensing the temperature of the light source 20 itself or its ambience.

As described above, in a blue-violet semiconductor laser diode made of GaN based materials, when the temperature rises by 1° C., the wavelength increases by approximately 0.05 nm. Thus, if the magnitude of the temperature variation is identified by $\Delta t$, then the magnitude of the wavelength variation is given by 0.05 $\Delta t$. For example, if $\Delta t=20°$ C., then the magnitude of the wavelength variation can be estimated to be 1 nm. Consequently, the magnitude of the wavelength variation can be estimated by sensing the temperature variation.

In the optical information reproduction/recording apparatus 100a of this preferred embodiment, the wavelength detecting section just needs to include a temperature sensor. Thus, the wavelength detecting diffractive optical element and the wavelength detecting photodetector can be omitted from the optical information reproduction/recording apparatus 100 of the first preferred embodiment. As a result, the arrangement of the optical system can be simplified.

An optical information reproduction/recording apparatus, a reproduction/recording method and an information recording medium have been described as first and second specific preferred embodiments of the present invention. However, the present invention is in no way limited to those specific preferred embodiments. But those preferred embodiments of the optical information reproduction/recording apparatus, reproduction/recording method and information recording medium could naturally be combined in any arbitrary manner without departing from the scope of the present invention and substantially the same effect as what has been described specifically can be achieved by any of those combinations.

It should be noted that the "objective lens", "collimator lens" and "detection lens" mentioned in the foregoing description of preferred embodiments are referred to as such just for the sake of convenience. And those lenses are normally called simply "lenses".

Furthermore, in the foregoing description of preferred embodiments, the information recording medium is supposed to be an optical disc. However, this is just an example and the information recording medium has only to be a medium that takes advantage of the absorption edge shifting phenomenon. Thus, the information recording medium may be in the shape of a card, a drum or a tape. An information reproduction and recording apparatus for reproduction and/or recording from/to those various media with mutually different thicknesses and storage densities also falls within the scope of the present invention.

INDUSTRIAL APPLICABILITY

The present invention is applicable particularly effectively to an optical information reproduction/recording apparatus and reproduction/recording method for performing a reproduction/recording operation by taking advantage of the absorption edge shifting phenomenon and to an information recording medium that includes a material to cause the absorption edge shifting phenomenon.

The invention claimed is:

1. An apparatus comprising:
a light source for emitting a laser beam;
a lens for condensing the laser beam onto an information recording medium; and
a photodetector for detecting light that has been reflected from the information recording medium,
wherein a recording layer of the information recording medium includes a material that absorbs the laser beam at an increasing absorptance as the absorption edge of a light absorption spectrum shifts, with a rise in temperature, toward a longer wavelength range as a result of a band-to-band transition of electrons, and wherein the apparatus further includes:

a wavelength detecting section for detecting at least one of the wavelength of the laser beam and a variation in the wavelength;

a temperature sensing section for sensing at least one of the temperature of the information recording medium itself or its ambience and a variation in the temperature; and a control section for controlling the power of the light source based on the respective outputs of the wavelength detecting section and the temperature sensing section, and wherein in performing a recording operation, if the variation in the wavelength of the laser beam from its value in a reference state is identified by $\Delta\lambda$ and if the variation in the temperature of the information recording medium itself or its ambience from its value in the reference state is identified by $\Delta T$, the control section controls the power of the light source so that $\Delta\lambda/\Delta T$ falls within a predetermined range, wherein in performing a recording operation, if the variation in the wavelength of the laser beam from its value in a reference state is identified by $\Delta\lambda$, the variation in the temperature of the information recording medium itself or its ambience from its value in the reference state is identified by $\Delta T$, their factors of proportionality are identified by k1 and k2, respectively, and the power of the light source in the reference state is identified by P0, the control section controls the power P of the light source so that the power P satisfies $0.9P0$ $(k1\Delta\lambda)/(k2\Delta T)$ $\leq P \leq 1.1P0$ $(k1\Delta\lambda)/(k2\Delta T)$.

2. The apparatus of claim 1, wherein in performing a reproduction operation, if the variation in the wavelength of the laser beam from its value in a reference state is identified by $\Delta\lambda$, the variation in the temperature of the information recording medium itself or its ambience from its value in the reference state is identified by $\Delta T$, their factors of proportionality are identified by k1 and k2, respectively, and the power of the light source in the reference state is identified by P0, the control section controls the power P of the light source so that the power P satisfies $0.9P0$ $(k1\Delta\lambda)/(k2\Delta T)$ $\leq P \leq 1.1P0$ $(k1\Delta\lambda)/(k2\Delta T)$ in a situation where the information recording medium has an L to H property, but the control section controls the power P of the light source so that the power P satisfies $0.9P0$ $(k2\Delta T)/(k1\Delta\lambda)$ $\leq P \leq 1.1P0$ $(k2\Delta T)/(k1\Delta\lambda)$ in a situation where the information recording medium has an H to L property.

3. The apparatus of claim 1, wherein the factors of proportionality k1 and k2 satisfy k1=1.08 and k2=0.054, respectively.

4. The apparatus of claim 1, wherein the wavelength detecting section includes a wavelength-detecting, diffractive optical element for diffracting the laser beam, and a wavelength-detecting photodetector that has at least two split areas.

5. The apparatus of claim 4, further comprising a focus/tracking error signal generating optical element, wherein the diffractive optical element and the focus/tracking error signal generating optical element are arranged on the same substrate.

6. The apparatus of claim 4, further comprising:

a focus/tracking error signal generating optical element; and a focus/tracking error signal generating photodetector, wherein the focus/tracking error signal generating photodetector and the wavelength-detecting photodetector are arranged on the same substrate.

7. The apparatus of claim 1, wherein the wavelength detecting section includes a wavelength selecting filter and a wavelength-detecting photodetector.

8. The apparatus of claim 1, wherein the wavelength detecting section includes a temperature sensor for sensing at least one of the temperature of the light source itself or its ambience and a variation in the temperature.

9. The apparatus of claim 1, wherein the temperature sensing section includes an infrared sensor.

10. The apparatus of claim 1, further comprising a storage section that stores methods for controlling the power of the light source based on the output of the wavelength detecting section and based on the output of the temperature sensing section, respectively, wherein the control section controls the power of the light source by the methods for controlling the power of the light source.

11. The apparatus of claim 1, wherein the information recording medium stores sensitivity information about a variation in reproduction or recording sensitivity that has been caused by the variation in the wavelength of the laser beam and the variation in the temperature of the information recording medium itself or its ambience, and wherein the control section controls the power of the light source by reference to the sensitivity information.

12. An information recording medium comprising multiple recording layers and multiple space layers, which are alternately stacked one upon the other, and wherein each said recording layer includes a recording film, which is made of either $Bi_2O_x$ that satisfies $2.7 \leq x<3$ or $3<x \leq 3.3$ or a material mainly composed of such $Bi_2O_x$.

13. The information recording medium of claim 12, wherein each said recording layer further includes:

a first dielectric film, which has a higher melting point than the recording film and which includes no S; and a second dielectric film including ZnS, and wherein the first dielectric film is arranged between the recording film and the second dielectric film.

14. The information recording medium of claim 13, wherein the first dielectric film is mainly composed of at least one of $ZrSiO_4$, $ZrO_2$, $Y_2O_3$, $HfO_2$, $Al_2O_3$, AlN, $CeO_2$, $Dy_2O_3$ and MgO.

15. The information recording medium of claim 13, wherein the second dielectric film is mainly composed of $ZnS-SiO_2$.

16. The information recording medium of claim 12, wherein the recording film includes, as an additive, at least one of Ge, Nb, Ta, Cu, Mo, W, Cr, Al, Si, Ir, Ni, Co, Ru and Rh.

17. The information recording medium of claim 16, wherein the additive is included at an atomic number ratio of 1/44 to 1/9 with respect to Bi.

18. A method for getting a reproduction or recording operation performed by an apparatus on an information recording medium, wherein the apparatus comprises:

a light source for emitting a laser beam;

a lens for condensing the laser beam onto the information recording medium; and a photodetector for detecting light that has been reflected from the information recording medium, wherein a recording layer of the information recording medium includes a material that absorbs the laser beam at an increasing absorptance as the absorption edge of a light absorption spectrum shifts, with a rise in temperature, toward a longer wavelength range as a result of a band-to-band transition of electrons, and wherein the apparatus further includes:

a wavelength detecting section for detecting at least one of the wavelength of the laser beam and a variation in the wavelength;

a temperature sensing section for sensing at least one of the temperature of the information recording medium itself or its ambience and a variation in the temperature; and a control section for controlling the power of the light source based on the respective outputs of the wavelength detecting section and the temperature sensing section, and wherein in performing a recording operation, if the variation in the wavelength of the laser beam from its value in a reference state is identified by $\Delta\lambda$ and if the variation in the temperature of the information recording medium itself or its ambience from its value in the reference state is identified by $\Delta T$, the control section controls the power of the light source so that $\Delta\lambda/\Delta T$ falls within a predetermined range, comprising reproducing or recording information by irradiating the information recording medium with the laser beam, which has been emitted from the light source after having had its power controlled based on the respective outputs of the wavelength detecting section and the temperature sensing section, wherein in performing a recording operation, if the variation in the wavelength of the laser beam from its value in a reference state is identified by $\Delta\lambda$, the variation in the temperature of the information recording medium itself or its ambience from its value in the reference state is identified by $\Delta T$, their factors of proportionality are identified by k1 and k2, respectively, and the power of the light source in the reference state is identified by P0, the control section controls the power P of the light source so that the power P satisfies $0.9P0\ (k1\Delta\lambda)/(k2\Delta T) \leq P \leq 1.1P0\ (k1\Delta\lambda)/(k2\Delta T)$.

19. The apparatus of claim 1, wherein the control section determines the power of the light source in the reference state based on a result of a test recording operation that has been performed on the information recording medium, and wherein the control section is configured to perform a test recording operation on the information recording medium, if the output of either the wavelength detecting section or the temperature sensing section exceeds a predetermined value with respect to the output in the reference state, the control section re-performs the test recording operation and changes the powers of the light source based on a result of the re-performed test recording operation.

20. The method of claim 18, wherein the power of the light source in the reference state is determined based on a result of a test recording operation that has been performed on the information recording medium, and wherein if the output of either the wavelength detecting section or the temperature sensing section exceeds a predetermined value with respect to the output in the reference state, a test recording operation is performed on the information recording medium again, thereby changing the powers of the light source.

21. The apparatus of claim 2, wherein the factors of proportionality k1 and k2 satisfy k1=1.08 and k2=0.054, respectively.

* * * * *